United States Patent
Kozakura

(10) Patent No.: US 11,843,701 B2
(45) Date of Patent: Dec. 12, 2023

(54) COMPUTER-READABLE RECORDING MEDIUM STORING GENERATION PROGRAM FOR GENERATING AGGREGATION HASH VALUE BY AGGREGATING HASH VALUES FOR BLOCKS OF CONTENT, AND GENERATION APPARATUS FOR GENERATING AGGREGATION HASH VALUE BY AGGREGATING HASH VALUES FOR BLOCKS OF CONTENT

(71) Applicant: FUJITSU LIMITED, Kawasaki (JP)

(72) Inventor: Fumihiko Kozakura, Hachioji (JP)

(73) Assignee: Fujitsu Limited, Kawasaki (JP)

( * ) Notice: Subject to any disclaimer, the term of this patent is extended or adjusted under 35 U.S.C. 154(b) by 99 days.

(21) Appl. No.: 17/337,447

(22) Filed: Jun. 3, 2021

(65) Prior Publication Data
US 2022/0014380 A1    Jan. 13, 2022

(30) Foreign Application Priority Data
Jul. 10, 2020    (JP) ................. 2020-119370

(51) Int. Cl.
*H04L 9/32*    (2006.01)
*H04L 9/34*    (2006.01)
*H04L 9/06*    (2006.01)

(52) U.S. Cl.
CPC .......... *H04L 9/3242* (2013.01); *H04L 9/0662* (2013.01); *H04L 9/34* (2013.01)

(58) Field of Classification Search
CPC ............................ H04L 9/0662; H04L 9/3242
USPC ....................................................... 713/168
See application file for complete search history.

(56) References Cited

U.S. PATENT DOCUMENTS

| 10,372,943 | B1 * | 8/2019 | Rodriguez De Castro ................. G06F 21/72 |
| 2005/0015600 | A1 | 1/2005 | Miyazaki et al. |
| 2006/0294386 | A1 | 12/2006 | Yuval et al. |
| 2010/0104095 | A1 * | 4/2010 | Halevi ................. H04L 9/0643 380/29 |
| 2011/0194687 | A1 * | 8/2011 | Brothers ............... H04L 9/0668 380/28 |

(Continued)

FOREIGN PATENT DOCUMENTS

| JP | 2007-143184 A | 6/2007 |
| JP | 2008-545163 A | 12/2008 |
| JP | 2018-196108 A | 12/2018 |

OTHER PUBLICATIONS

"CWI and Google Announce First Collision for Industry Security Standard SHA-1", Centrum Wiskunde & Informatica, Available Online at: https://www.cwi.nl/news/2017/cwi-and-google-announce-first-collisionindustry-security-standard-sha-1, Feb. 27, 2017, 5 pages.

*Primary Examiner* — Bryan F Wright
(74) *Attorney, Agent, or Firm* — XSENSUS LLP

(57) ABSTRACT

A non-transitory computer-readable recording medium stores a generation program for causing a computer to execute a process including: dividing a target content into a plurality of blocks so that head information of the target content is distributed to the blocks different from each other, according to a predetermined rule; generating a hash value corresponding to each of the plurality of divided blocks; generating an aggregation hash value by aggregating the generated hash values; and outputting the generated aggregation hash value.

8 Claims, 23 Drawing Sheets

(56) References Cited

U.S. PATENT DOCUMENTS

| | | | |
|---|---|---|---|
| 2015/0379276 A1* | 12/2015 | Glickman | G06F 21/78 |
| | | | 713/193 |
| 2016/0378752 A1* | 12/2016 | Anderson | G06F 16/2255 |
| | | | 707/747 |
| 2016/0378824 A1* | 12/2016 | Li | G06F 16/24532 |
| | | | 707/715 |
| 2018/0060612 A1* | 3/2018 | Gladwin | G06F 21/85 |
| 2019/0165946 A1 | 5/2019 | Unagami et al. | |
| 2021/0176038 A1* | 6/2021 | Bortnikov | G06F 21/64 |

* cited by examiner

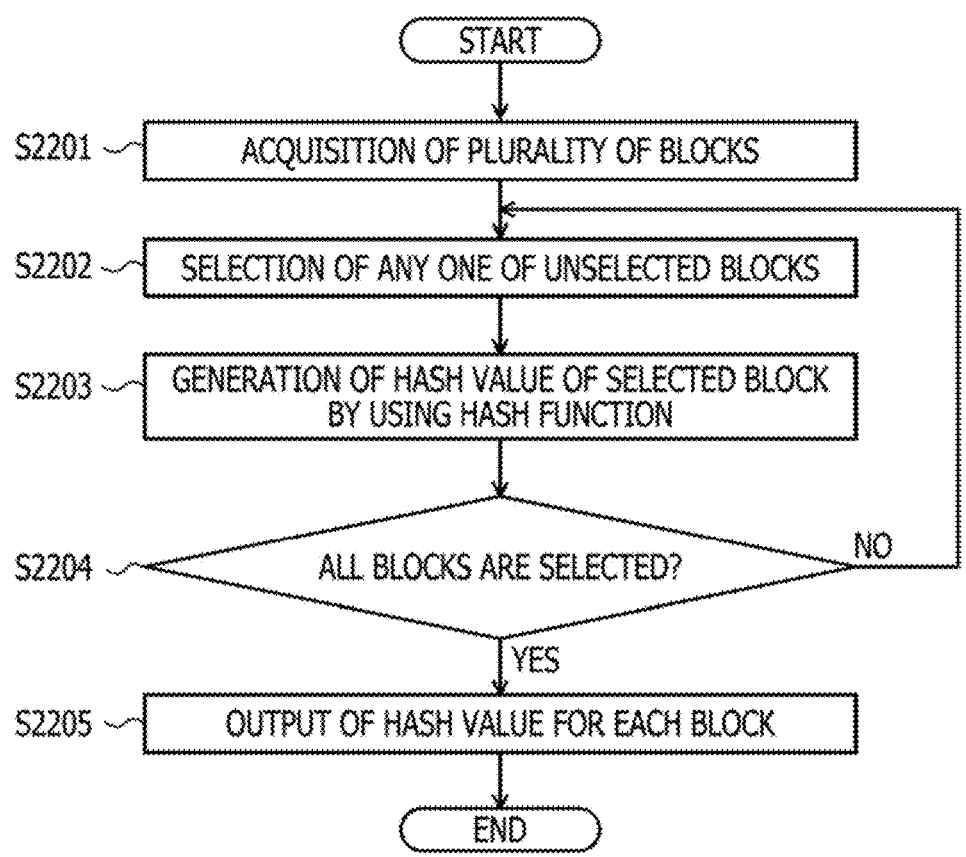

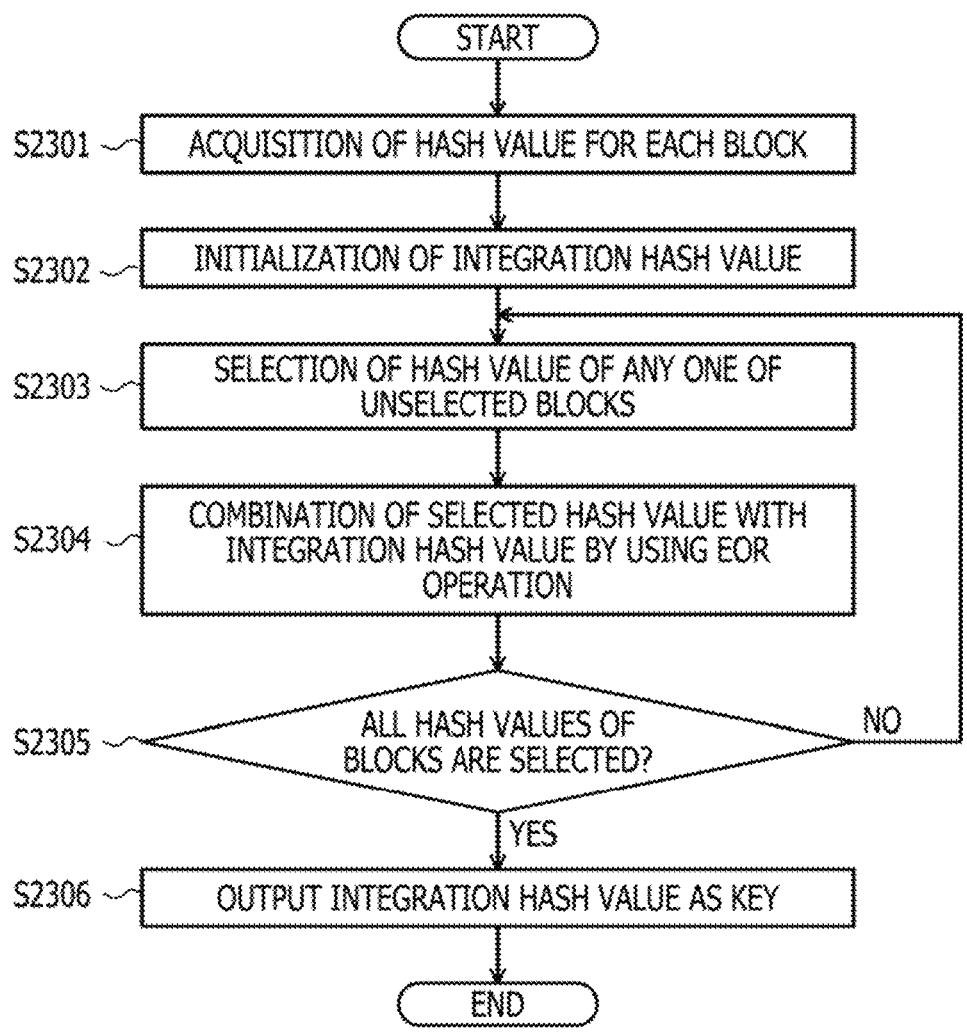

COMPUTER-READABLE RECORDING MEDIUM STORING GENERATION PROGRAM FOR GENERATING AGGREGATION HASH VALUE BY AGGREGATING HASH VALUES FOR BLOCKS OF CONTENT, AND GENERATION APPARATUS FOR GENERATING AGGREGATION HASH VALUE BY AGGREGATING HASH VALUES FOR BLOCKS OF CONTENT

CROSS-REFERENCE TO RELATED APPLICATION

This application is based upon and claims the benefit of priority of the prior Japanese Patent Application No. 2020-119370, filed on Jul. 10, 2020, the entire contents of which are incorporated herein by reference.

FIELD

The embodiments discussed herein are related to a computer-readable recording medium storing a generation program, a generation method, and a generation apparatus.

BACKGROUND

In the related art, there is a value called a hash value which is generated from original data and is used as information for identifying the original data. The hash value is used, for example, for processes such as data encryption, data authentication, data search, and data comparison.

Examples of the related art include Japanese Laid-open Patent Publication No. 2018-196108, Japanese Laid-open Patent Publication No. 2007-143184, and Japanese National Publication of International Patent Application No. 2008-545163.

SUMMARY

According to an aspect of the embodiments, a non-transitory computer-readable recording medium stores a generation program for causing a computer to execute a process including: dividing a target content into a plurality of blocks so that head information of the target content is distributed to the blocks different from each other, according to a predetermined rule; generating a hash value corresponding to each of the plurality of divided blocks; generating an aggregation hash value by aggregating the generated hash values; and outputting the generated aggregation hash value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 22 is a flowchart illustrating an example of a generation process procedure; and FIG. 23 is a flowchart illustrating an example of a hash value integration process procedure.

DESCRIPTION OF EMBODIMENTS

For example, there is a technology of verifying a content based on a plurality of first hash values respectively generated from a plurality of pieces of partial data obtained by dividing the content and second hash values respectively generated from N pieces of partial data among the plurality of pieces of partial data. There is a technology of dividing an electronic document into configuration elements, calculating a hash value for each of the configuration elements, and assigning a signature to data obtained by combining the calculated hash values. For example, there is a technology of generating an element that appears randomly by using a certain process based on a message and combining the generated element with the message.

Meanwhile, in the related art, there is a problem that two hash values generated from contents which are different from each other become identical values, a so-called collision of the hash values occurs.

In one aspect, a collision between hash values may be easily avoided.

Hereinafter, embodiments of a generation program, a generation method, and a generation apparatus according to the present disclosure are described in detail with reference to the drawings.

Example of Generation Method According to Embodiment

Figure 1:
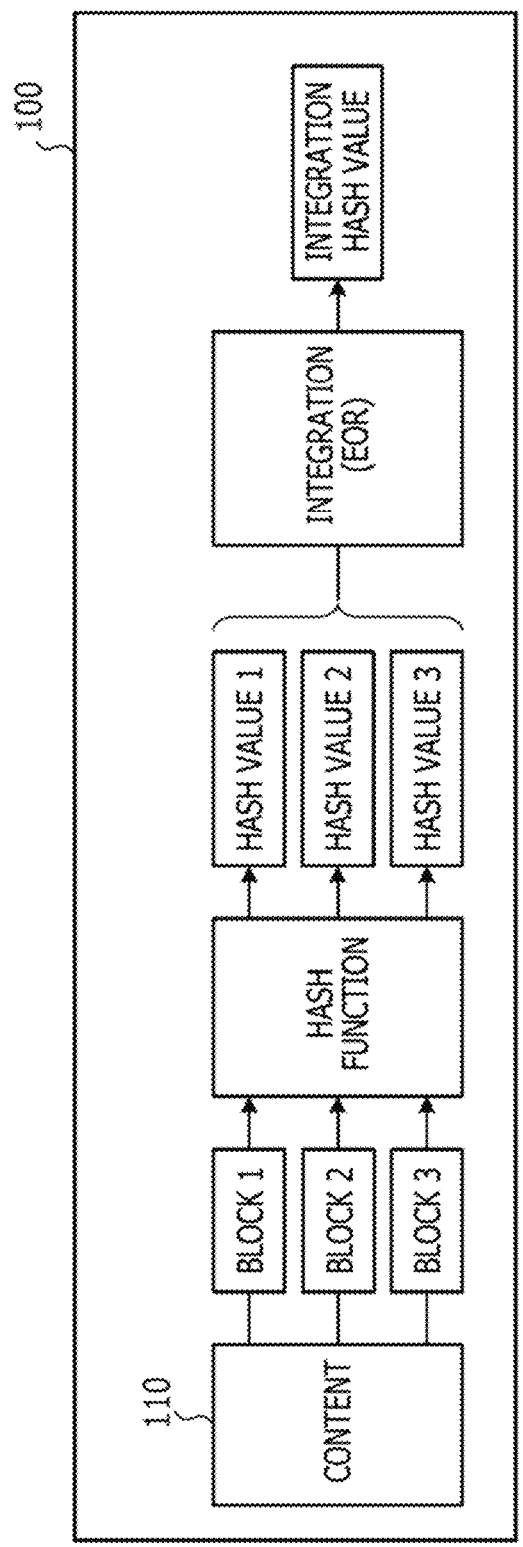
FIG. 1 is an explanatory diagram illustrating an example of a generation method according to an embodiment.

FIG. 1 is an explanatory diagram illustrating an example of a generation method according to an embodiment. A generation apparatus 100 is a computer that generates a hash value for a target content. The generation apparatus 100 is, for example, a server, a personal computer (PC), or the like.

The hash value is used, for example, for processes such as data encryption, data authentication, data search, and data comparison. For example, it is considered to determine whether or not two contents coincide with each other based on whether or not hash values generated from respective contents of the two contents coincide with other, by using the fact that hash values generated from identical contents are usually identical values.

For example, a case where the hash value is used for a blockchain technology is considered. In this case, by recording the hash value generated from the content in a block of a blockchain, a node included in the blockchain network treats that the content is registered in the block of the blockchain.

Meanwhile, in the related art, two hash values generated from different contents have identical values, and the two hash values may collide with each other.

Therefore, for example, it is able to be difficult to appropriately execute processes such as data encryption, data authentication, data search, and data comparison. For example, two hash values generated from different contents may coincide with each other, and the different contents may be treated as the same content by mistake.

For example, although a hash value of a content A is recorded in the block of the blockchain, the hash value of the content A is identical with a hash value of a content B, in some cases. In this case, it is not possible to discriminate any one of the content A and the content B is indicated by the hash value recorded in the block of the blockchain and whether the content is handled as the content registered in the block of the blockchain. Therefore, there is a problem that an attacker may replace the content A registered in the block of the blockchain with the content B.

It may happen by chance that two hash values generated from different contents have identical values and the two hash values collide with each other. It is proved by Google and the Dutch research institute CWi that the two hash values generated from the different contents may collide with each other on purpose.

For example, for the proved contents, characteristics, with which it is possible to generate an identical hash value in front information, and it is possible to cause the hash values of the two contents to collide with each other when rear information following the information is common, of the two different contents is used. For the proved contents, for example, a press release of CWi disclosed in a Uniform Resource Locator (URL) described below may be referred to.

Https://www.cwi.nl/news/2017/cwi-and-google-announce-first-collision-industry-security-standard-sha-1

On the other hand, as a method of reducing probability that the hash values collide with each other, for example, a method of generating two types of hash values from the content by using two types of hash algorithms and combining the two types of hash values is considered. This method has a problem that it is not possible to take measures against the characteristics described above, and it is not possible to defend an attack that the two hash values generated from the different contents collide with each other.

As a method of reducing the probability of the hash values colliding with each other, for example, a method is considered in which a hash value generated from a content is used as a key for generating a keyed hash value for the content again. In this method, for example, by an exclusive OR operation (EOR operation), the key is combined with a content, and a hash value is generated for the content combined with the key. This method has a problem that it is not possible to take measures against the characteristics described above, and it is not possible to defend an attack that the two hash values generated from the different contents collide with each other.

In the present embodiment, for generating a hash value for a target content, in consideration of the characteristics described above, a generation method capable of easily avoiding that a hash value generated this time collides with a hash value generated from another content will be described.

In FIG. 1, the generation apparatus 100 stores a predetermined rule. The predetermined rule defines a method of dividing a content into a plurality of blocks. The number of blocks to be divided is preferably a prime number, for example. The predetermined rule is a rule for dividing the content into the plurality of blocks so that front information in the content is distributed to different blocks. The generation apparatus 100 stores a hash function. The hash function is defined in, for example, Secure Hash Algorithm (SHA)-1, SHA-2, or the like.

(1-1) The generation apparatus 100 acquires a target content 110. For example, the generation apparatus 100 acquires the target content 110 by accepting an input of the target content 110 based on an operation input by a user. For example, the generation apparatus 100 may acquire the target content 110 by receiving the target content 110 from another computer.

(1-2) The generation apparatus 100 divides the target content 110 into a plurality of blocks according to the predetermined rule. For example, the generation apparatus 100 divides the target content 110 into the plurality of blocks by allocating a plurality of pieces of partial data obtained by sectioning the target content 110 into designated length units from a head of the target content 110 to each block of the plurality of blocks, according to a predetermined order. In the example in FIG. 1, the generation apparatus 100 divides the target content 110 into a block 1, a block 2, and a block 3.

(1-3) The generation apparatus 100 generates a hash value corresponding to each of the plurality of divided blocks. The generation apparatus 100 generates the hash value corresponding to each of the plurality of divided blocks by using a hash function. In the example in FIG. 1, the generation apparatus 100 generates a hash value 1 corresponding to the block 1, a hash value 2 corresponding to the block 2, and a hash value 3 corresponding to the block 3.

(1-4) The generation apparatus 100 generates an aggregation hash value by aggregating the generated hash values. The generation apparatus 100 generates the aggregation hash value obtained by aggregating the generated hash values by an EOR operation, for example. For example, the generation apparatus 100 may generate the aggregation hash value by aggregating the generated hash values by an arithmetic operation such as addition or subtraction. In the example in FIG. 1, the generation apparatus 100 performs the EOR operation on the hash value 1 corresponding to the block 1, the hash value 2 corresponding to the block 2, and the hash value 3 corresponding to the block 3 so as to generate the aggregation hash value.

(1-5) The generation apparatus 100 outputs the generated aggregation hash value. For example, the generation apparatus 100 outputs the generated aggregation hash value as information for identifying the target content 110. Thus, the generation apparatus 100 may easily avoid a collision between the hash values. For example, the generation apparatus 100 may generate a hash value for the target content 110 after distributing head information of the target content 110 to the plurality of blocks. Therefore, the generation apparatus 100 may easily defend against an attack that attempts collision of the hash values on purpose.

The case where the generation apparatus 100 outputs the aggregation hash value as the information for identifying the target content 110 is described herein, and the configuration is not limited thereto. For example, the generation apparatus 100 may generate a keyed hash value for the target content 110 by using the aggregation hash value as a key, and output the keyed hash value as the information for identifying the target content 110.

The generation apparatus 100 may be applied to, for example, a blockchain network. An example in which the generation apparatus 100 is applied to the blockchain network will be described later with reference to FIGS. 2 and 3, for example.

Example of Blockchain Management System 200

Next, with reference to FIG. 2, an example of a blockchain management system 200 to which the generation apparatus 100 illustrated in FIG. 1 is applied will be described.

Figure 2:
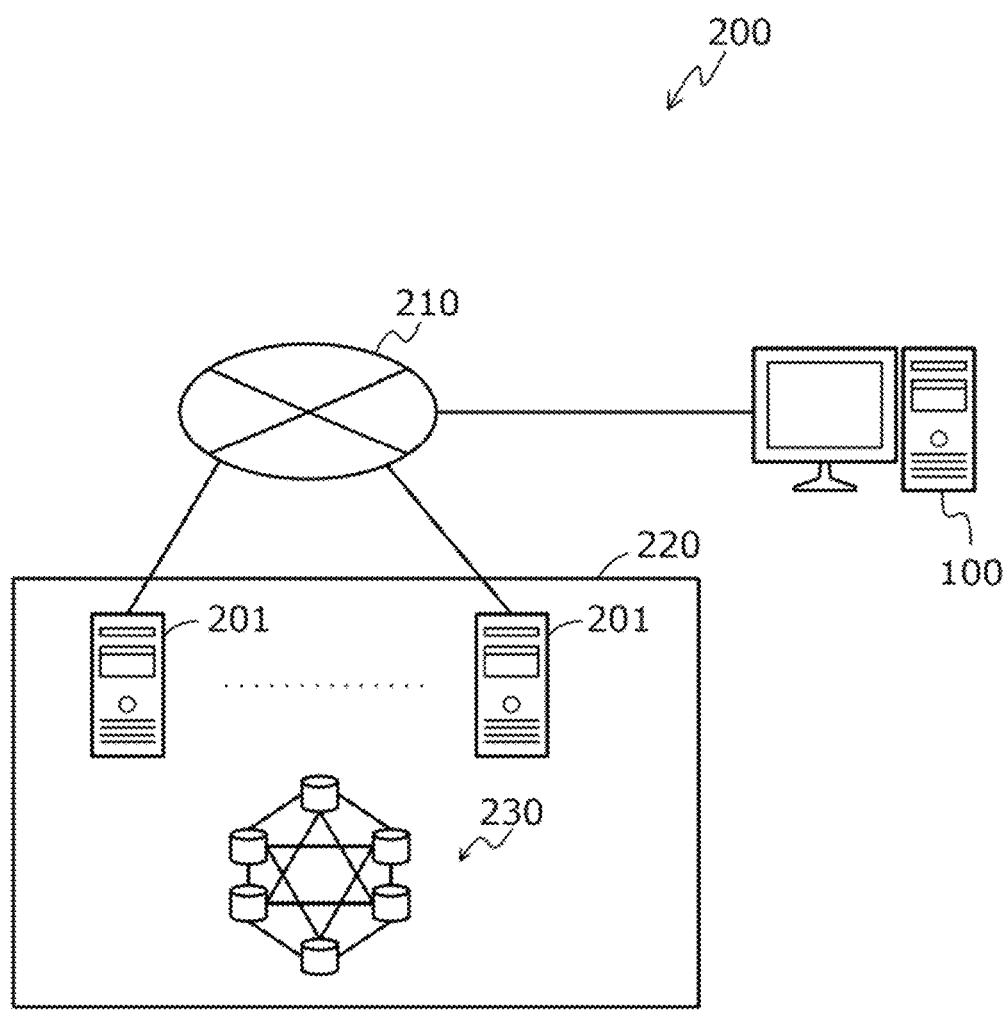
FIG. 2 is an explanatory diagram illustrating an example of a blockchain management system.

FIG. 2 is an explanatory diagram illustrating an example of the blockchain management system 200. In FIG. 2, the blockchain management system 200 includes one or more generation apparatuses 100 and a plurality of node terminals 201.

In the blockchain management system 200, the node terminal 201 and the generation apparatus 100 are coupled to each other via a wired or wireless network 210. The network 210 is, for example, a local area network (LAN), a wide area network (WAN), the Internet, or the like.

The blockchain management system 200 is formed to realize, for example, a public type blockchain, a consortium type blockchain, or a private type blockchain. It is assumed that the blockchain management system 200 is formed to realize, for example, the public type blockchain.

The generation apparatus 100 generates a hash value for a target content. The generation apparatus 100 transmits the hash value generated for the target content to the node terminal 201 and causes the node terminal 201 to record the hash value in a block of the blockchain, so that the target content is registered in the block of the blockchain. The generation apparatus 100 is, for example, a server, a PC, or the like.

The node terminal 201 is a computer which forms a blockchain infrastructure 220. Each of the node terminals 201 stores an identical blockchain 230. The blockchain 230 is, for example, a list serving as a distributed ledger that manages transaction information by coupling blocks in which the transaction information is registered. The node terminal 201 receives the hash value generated for the target content from the generation apparatus 100, and records the hash value in the block of the blockchain 230. The node terminal 201 is, for example, a server, a PC, or the like.

The case where the generation apparatus 100 generates the hash value for the target content and transmits the hash value to the node terminal 201 is described herein, and the embodiment is not limited thereto. For example, the generation apparatus 100 may transmit the target content as it is to the node terminal 201. In this case, the node terminal 201 has a function as the generation apparatus 100, and generates the hash value for the received target content.

The case where the blockchain management system 200 is formed to realize the public type blockchain is described herein, and the embodiment is not limited thereto. For example, the blockchain management system 200 may be formed to realize a consortium type blockchain or a private type blockchain. In this case, the blockchain management system 200 may include a leader terminal 202 that manages the node terminal 201.

Use Example of Blockchain Management System 200

Next, with reference to FIG. 3, a use example of the blockchain management system 200 will be described.

Figure 3:
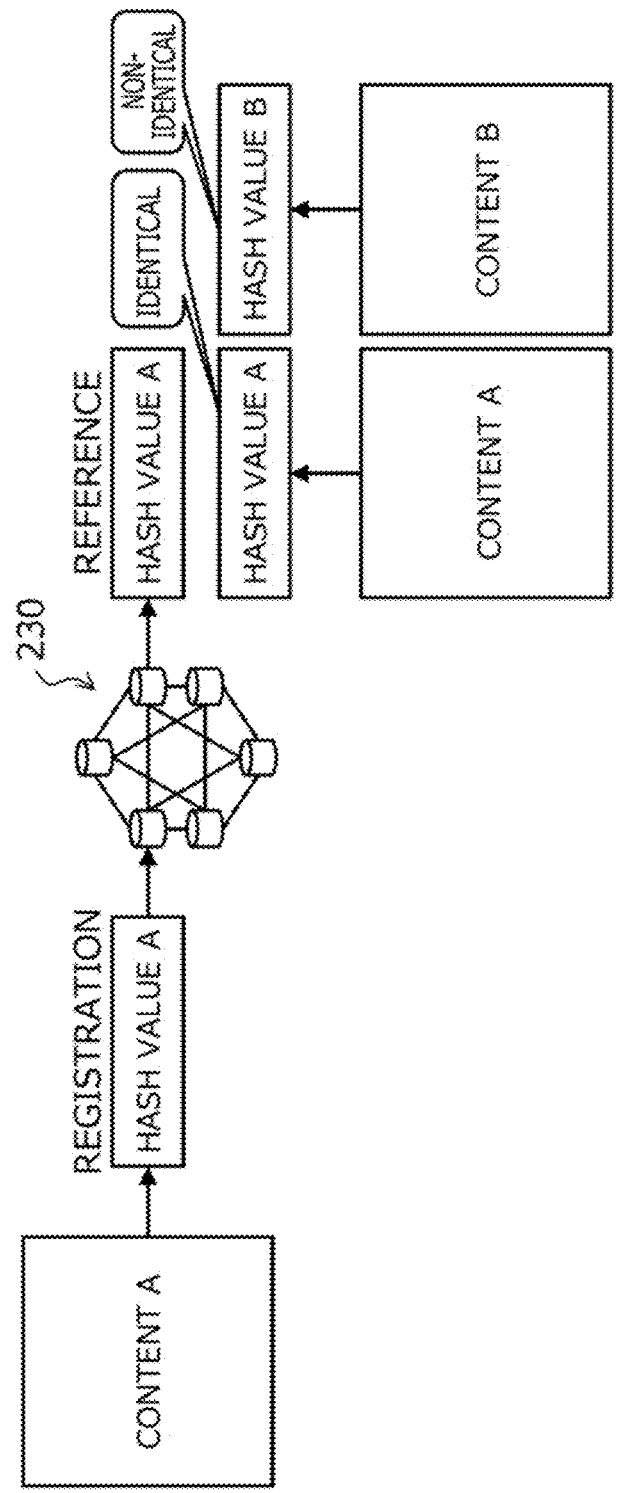
FIG. 3 is an explanatory diagram illustrating a use example of the blockchain management system.

FIG. 3 is an explanatory diagram illustrating a use example of the blockchain management system 200. In FIG. 3, the generation apparatus 100 generates a hash value A of the content A so as not to collide with hash values of other contents, and records the hash value A in the blockchain 230 via the node terminal 201. Thus, the generation apparatus 100 may discriminate the content A from other contents registered in the blockchain 230 without confusion with the other contents.

For example, a case where the generation apparatus 100 attempts to discriminate whether or not the content A is a content registered in the blockchain 230 is considered. In this case, the generation apparatus 100 generates the hash value A for the content A and compares the hash value A with the hash value A recorded in the blockchain 230. Since the generated hash value A coincides with the hash value A recorded in the blockchain 230, the generation apparatus 100 may discriminate that the content A is a content registered in the blockchain 230.

For example, a case where the generation apparatus 100 attempts to discriminate whether or not the content B is a content registered in the blockchain 230 is considered. In this case, the generation apparatus 100 generates the hash value B for the content B and compares the hash value B with the hash value A recorded in the blockchain 230. Since the generated hash value B does not coincide with the hash value A recorded in the blockchain 230, the generation apparatus 100 may discriminate that the content B is not a content registered in the blockchain 230.

Hardware Configuration Example of Generation Apparatus 100

Next, a hardware configuration example of the generation apparatus 100 will be described with reference to FIG. 4.

Figure 4:
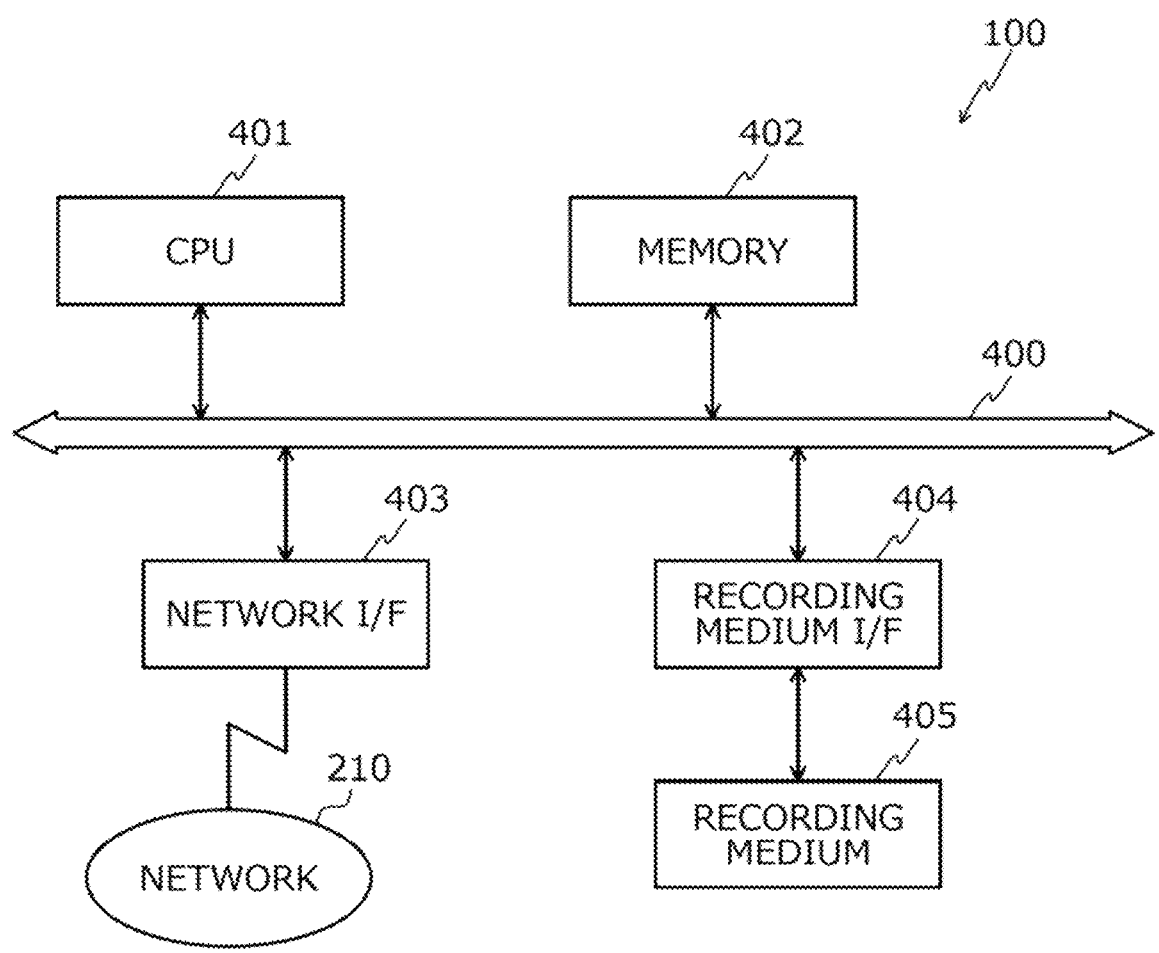
FIG. 4 is a block diagram illustrating a hardware configuration example of a generation apparatus.

FIG. 4 is a block diagram illustrating a hardware configuration example of the generation apparatus 100. In FIG. 4, the generation apparatus 100 includes a central processing unit (CPU) 401, a memory 402, a network interface (I/F)

403, a recording medium I/F 404, and a recording medium 405. The respective configuration units are coupled to one another through a bus 400.

The CPU 401 controls the entirety of the generation apparatus 100. The memory 402 includes, for example, a read-only memory (ROM), a random-access memory (RAM), a flash ROM, and the like. For example, the flash ROM and the ROM store various programs, and the RAM is used as a work area of the CPU 401. The program stored in the memory 402 causes the CPU 401 to execute coded processes by being loaded into the CPU 401.

The network I/F 403 is coupled to the network 210 through a communication line and is coupled to another computer via the network 210. The network I/F 403 controls the network 210 and an internal interface so as to control an input and an output of data from and to the other computer. The network I/F 403 is, for example, a modem, a LAN adapter, or the like.

The recording medium I/F 404 controls read/write of data from/to the recording medium 405 under the control of the CPU 401. The recording medium I/F 404 is, for example, a disk drive, a solid-state drive (SSD), a Universal Serial Bus (USB) port, or the like. The recording medium 405 is a nonvolatile memory that stores the data written under the control of the recording medium I/F 404. The recording medium 405 is, for example, a disk, a semiconductor memory, a USB memory, or the like. The recording medium 405 may be attachable and detachable from the generation apparatus 100.

In addition to the configuration units described above, the generation apparatus 100 may include, for example, a keyboard, a mouse, a display, a printer, a scanner, a microphone, a speaker, and the like. The generation apparatus 100 may include a plurality of recording medium I/Fs 404 or a plurality of recording media 405. The generation apparatus 100 may not include the recording medium I/F 404 or the recording medium 405.

Functional Configuration Example of Generation Apparatus 100

Next, a functional configuration example of the generation apparatus 100 will be described with reference to FIG. 5.

Figure 5:
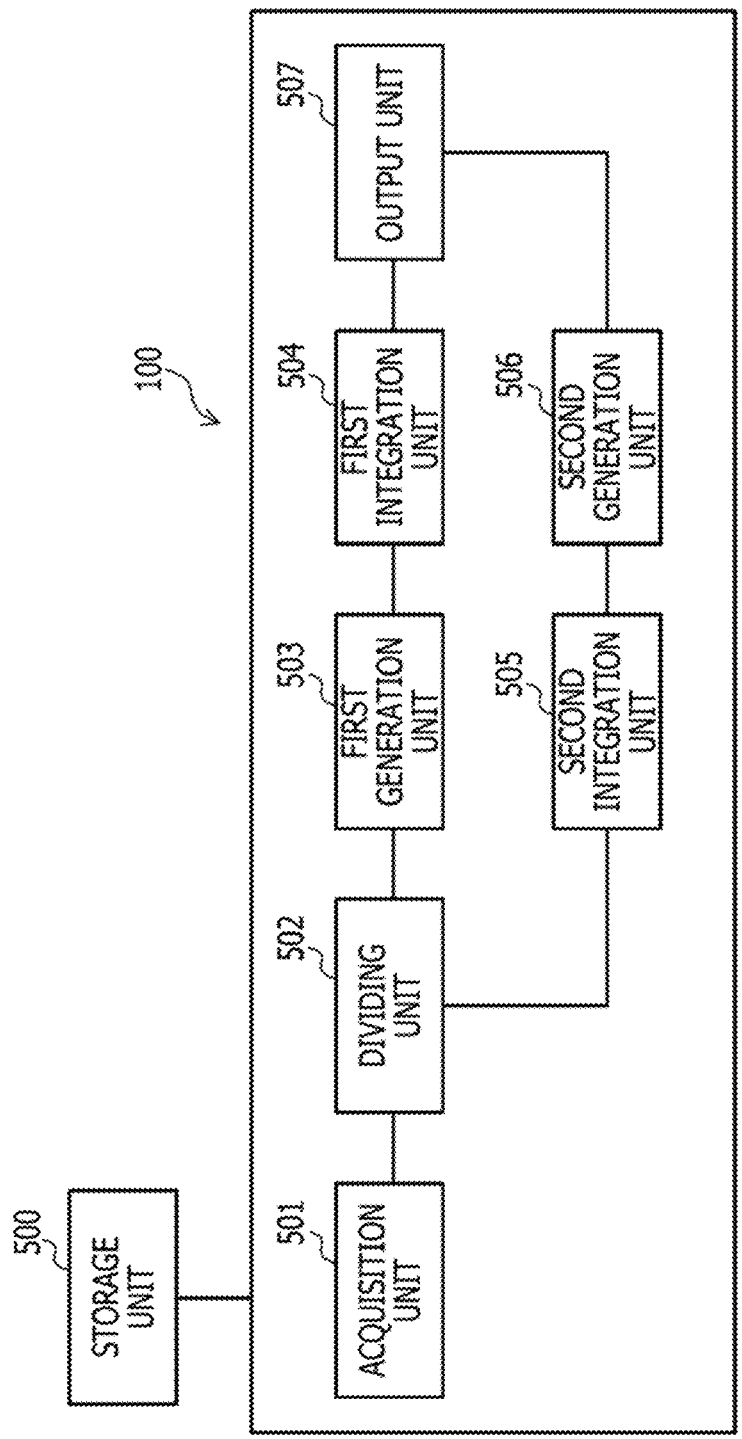
FIG. 5 is a block diagram illustrating a functional configuration example of the generation apparatus.

FIG. 5 is a block diagram illustrating a functional configuration example of the generation apparatus 100. The generation apparatus 100 includes a storage unit 500, an acquisition unit 501, a dividing unit 502, a first generation unit 503, a first integration unit 504, a second integration unit 505, a second generation unit 506, and an output unit 507.

The storage unit 500 is realized by, for example, a storage area of the memory 402, the recording medium 405, or the like illustrated in FIG. 4. Hereinafter, a case where the storage unit 500 is included in the generation apparatus 100 will be described, and the embodiment is not limited thereto. For example, there may be a case where the storage unit 500 is included in an apparatus different from the generation apparatus 100 and the generation apparatus 100 may be referred to storage contents of the storage unit 500.

The acquisition unit 501 to the output unit 507 function as an example of a control unit. For example, functions of the acquisition unit 501 to the output unit 507 are implemented by causing the CPU 401 to execute a program stored in the storage area such as the memory 402 and the recording medium 405 illustrated in FIG. 4 or by using the network I/F 403. Results of processes performed by the respective functional units are stored in, for example, the storage area of the memory 402, the recording medium 405, and the like illustrated in FIG. 4.

The storage unit 500 stores various types of information to be referred to or updated in the processes of the respective functional units. The storage unit 500 stores a method of generating a hash value. The storage unit 500 stores, for example, a hash function. The hash function is defined by, for example, SHA-1, SHA-2, or the like.

The storage unit 500 stores a predetermined rule. The predetermined rule defines a method of dividing a content into a plurality of blocks. The number of blocks to be divided is preferably a prime number, for example. The predetermined rule defines, for example, a method of dividing the content into blocks the number of which is a prime number. The predetermined rule is set by the user, for example. The predetermined rule defines, for example, a method of dividing the content into a plurality of blocks corresponding to a predetermined number of divisions. The number of divisions is set by the user, for example. The number of divisions is preferably a prime number, for example.

It is preferable that the predetermined rule defines a method of dividing the content into a plurality of blocks so that head information of the content is distributed to different blocks. For example, it is preferable that the predetermined rule defines a method of dividing the content into a plurality of blocks so that a block including data having a predetermined length at the head of the content as it is, is not generated. The predetermined length is a length with which a hash value of the content may collide with a hash value of another content. The predetermined rule preferably defines a method of dividing the content into a plurality of blocks so that, for example, data having a predetermined length at the head of the content is distributed to each of the plurality of blocks.

For example, it is preferable that the predetermined rule defines a method of dividing the content into a plurality of blocks so that the block includes two or more pieces of discontinuous data of the original content. In other words, for example, the predetermined rule preferably defines a method of dividing the content into a plurality of blocks so that a block including only continuous pieces of data of the original content is not generated. For example, it is preferable that the predetermined rule is not a rule for equally dividing the content into a predetermined number of divisions from the head of the content.

For example, the predetermined rule is a rule for dividing the content into a plurality of blocks by allocating each data having a designated length included in the content to each of the plurality of blocks in a predetermined order. The designated length is preferably a prime number. It is preferable that the designated length be smaller than a predetermined length which causes a hash value of the content to collide with a hash value of another content.

When the number of divisions or the designated length is a prime number, it is possible to easily avoid a situation in which, when the content is divided in unit lengths such as 8 bytes, all pieces of data which exists at identical positions in each data of 8 bytes are allocated to the same block. Therefore, it is difficult for an attacker to perform an attack that intentionally causes the hash values to collide with each other on purpose.

For example, the predetermined rule is a rule for allocating each data having the designated length included in the target content to each of the plurality of blocks in accordance with a predetermined order in a case where the target content is sectioned into designated length units, and the designated length may be variable. The designated length may be, for example, relatively short at a head side of the content and relatively long on an end side of the content.

The predetermined order is, for example, an order along numbers allocated to the blocks. The predetermined order may be an order defined by a pseudo-random number machine based on a seed. The seed is generated based on a predetermined location of the content. The seed is generated, for example, based on a head location of the content. For example, the seed may be a hash value generated from the head location of the content.

The acquisition unit 501 acquires various types of information used for processes of the respective functional units. The acquisition unit 501 stores the acquired various types of information in the storage unit 500 or outputs the information to the respective functional units. The acquisition unit 501 may output the various types of information stored in the storage unit 500 to the respective functional units. For example, the acquisition unit 501 acquires various types of information based on an operation input by the user. For example, the acquisition unit 501 may receive the various types of information from an apparatus different from the generation apparatus 100.

The acquisition unit 501 acquires a target content for which a hash value is to be generated. For example, the acquisition unit 501 acquires the target content by accepting an input of the target content based on an operation input of the user. For example, the acquisition unit 501 may acquire the target content by receiving the target content from an apparatus different from the generation apparatus 100.

The acquisition unit 501 may accept a start trigger for starting a process of any functional unit. The start trigger is, for example, a predetermined operation input by the user. The start trigger may be reception of predetermined information from another computer, for example. The start trigger may be, for example, an output of the predetermined information by any one of the functional units.

The dividing unit 502 divides the target content into a plurality of blocks according to a predetermined rule. For example, the dividing unit 502 divides the target content into the plurality of blocks by allocating each data having a designated length included in the target content to each of the plurality of blocks according to the predetermined order. For example, the dividing unit 502 divides the target content into the plurality of blocks by allocating a plurality of pieces of partial data obtained by sectioning the target content into designated length units from a head of the target content, to each block of the plurality of blocks in accordance with the predetermined order.

For example, the dividing unit 502 allocates the plurality of pieces of partial data obtained by sectioning the target content into the designated length units from the head of the target content in accordance with an order along numbers which are allocated to the blocks, to each of the plurality of blocks. Thus, the dividing unit 502 may distribute head information of the target content to the plurality of blocks, and it is possible to generate the hash values which are unlikely to collide with each other.

For example, the dividing unit 502 generates a seed based on a predetermined location of the target content. The seed is, for example, a hash value generated from the predetermined location. For example, the dividing unit 502 allocates the plurality of pieces of partial data obtained by sectioning the target content into the designated length units from the head of the target content, to the respective blocks of the plurality of blocks according to an order defined by the pseudo-random number machine based on the seed. Thus, the dividing unit 502 may distribute head information of the target content to the plurality of blocks, and it is possible to generate the hash values which are unlikely to collide with each other.

The first generation unit 503 generates a hash value corresponding to each of the plurality of divided blocks. The first generation unit 503 generates the hash value corresponding to each of the plurality of divided blocks by using a hash function. Thus, the first generation unit 503 may generate information for identifying the target content.

The first integration unit 504 generates an aggregation hash value by aggregating the generated hash values. The first integration unit 504 aggregates the hash values corresponding to the respective blocks by, for example, an EOR operation to generate the aggregation hash value. Thus, the first integration unit 504 may generate the aggregation hash value which is information for identifying the target content. At this time, since the first integration unit 504 uses the hash values of the respective blocks generated after the head information of the target content is distributed to the plurality of blocks, it is possible to generate aggregation hash values which are unlikely to collide with each other.

For example, the first integration unit 504 may generate an aggregation hash value obtained by aggregating the hash values corresponding to the respective blocks having a data length longer than the hash values corresponding to the respective blocks. For example, the first integration unit 504 may generate the aggregation hash value obtained by aggregating the hash values corresponding to the respective blocks.

For example, the first integration unit 504 aggregates a hash value of i-th at a position of i×n bytes from the head of the initialized storage area having a prescribed length by an EOR operation so as to generate an aggregation hash value having the prescribed length. The prescribed length is a length longer than a data length of the hash value. Thus, the first integration unit 504 may generate the aggregation hash value which is information for identifying the target content. At this time, since the first integration unit 504 uses the hash values of the respective blocks generated after the head information of the target content is distributed to the plurality of blocks, it is possible to generate aggregation hash values which are unlikely to collide with each other.

The second generation unit 506 generates a total hash value corresponding to the entire target content by using the generated aggregation hash value as a key. For example, the second generation unit 506 combines the aggregation hash value serving as the key with the target content by an EOR operation, and generates a hash value corresponding to the combined content as the total hash value by using a hash function. Thus, the second generation unit 506 may generate the total hash value as the information for identifying the target content. At this time, since the second integration unit 505 uses the aggregation hash value generated after distributing the head information of the target content to the plurality of blocks, as a key, it is possible to generate aggregation hash values which are unlikely to collide with each other.

For example, the second generation unit 506 may generate the total hash value based on integration data that is different from the target content and is obtained by integrating the plurality of divided blocks, by using the generated aggregation hash value as the key. For example, the second generation unit 506 couples the plurality of blocks so as to generate the integration data, and combines the aggregation hash values to be the key by the EOR operation. For example, the second generation unit 506 generates a hash value corresponding to the combined integration data as the total hash value by using the hash function. Thus, the second generation unit 506 may generate the total hash value as the information for identifying the target content. At this time, since the second generation unit 506 uses the integration data generated after the head information of the target content is distributed to the plurality of blocks, it is possible to generate total hash values which are unlikely to collide with each other.

For example, the second generation unit 506 may generate a total hash value corresponding to the entire target content based on the integration data obtained by integrating the plurality of divided blocks. For example, the second generation unit 506 couples the plurality of blocks so as to generate the integration data. For example, the second generation unit 506 generates a hash value corresponding to the generated integration data as the total hash value by using the hash function. Thus, the second generation unit 506 may generate the total hash value as the information for identifying the target content. At this time, since the second generation unit 506 uses the integration data generated after the head information of the target content is distributed to the plurality of blocks, it is possible to generate total hash values which are unlikely to collide with each other.

The output unit 507 outputs the processing result of at least one of the functional units. An output type is, for example, displaying on a display, outputting to a printer for printing, transmitting to an external apparatus through the network I/F 403, or storing in a storage area of the memory 402, the recording medium 405, or the like. Thus, the output unit 507 may notify the user of the processing result of at least one of the functional units, and it is possible to improve convenience of the generation apparatus 100.

The output unit 507 outputs the generated aggregation hash value. For example, the output unit 507 outputs the generated aggregation hash value as the information for identifying the target content. For example, the output unit 507 transmits the generated aggregation hash value to the node terminal 201 as the information for identifying the target content. Thus, the output unit 507 may use the hash value which is unlikely to collide and the information for identifying the target content.

The output unit 507 outputs the generated total hash value. For example, the output unit 507 outputs the generated total hash value as the information for identifying the target content. For example, the output unit 507 transmits the generated total hash value to the node terminal 201 as the information for identifying the target content. Thus, the output unit 507 may use the hash value which is unlikely to collide and the information for identifying the target content.

Example of Operation of Generation Apparatus 100

Next, an example of an operation of the generation apparatus 100 is described with reference to FIGS. 6 to 10.

Figure 6:
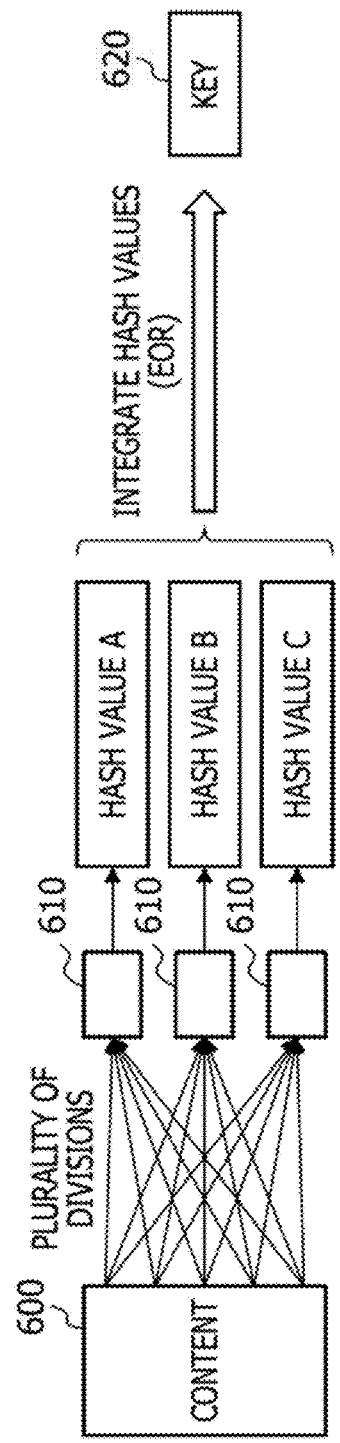
FIG. 6 is an explanatory diagram (part 1) illustrating an example of an operation of the generation apparatus.

FIGS. 6 to 10 are explanatory diagrams illustrating the example of the operation of the generation apparatus 100. In FIG. 6, the generation apparatus 100 acquires a content 600.

The generation apparatus 100 divides the content 600 into a predetermined number of blocks 610. The predetermined number is preferably a prime number. In the example in FIG. 6, the predetermined number is 3. For example, the generation apparatus 100 divides the content 600 into three blocks 610 by allocating each data having a designated length of the content 600 to the three blocks 610. The designated length is preferably a prime number. The designated length is designated by the user in advance, for example.

The generation apparatus 100 generates a hash value corresponding to each block 610 of the three blocks 610 by using a hash function. In the example in FIG. 6, the generation apparatus 100 generates a hash value A, a hash value B, and a hash value C.

The generation apparatus 100 executes an EOR operation to generate, as a key 620, an aggregation hash value obtained by aggregating the hash value A, the hash value B, and the hash value C. A length of the aggregation hash value is, for example, identical with a length of each of the hash value A, the hash value B, and the hash value C. The length of each of the hash value A, the hash value B, and the hash value C is, for example, 32 bytes. The length of the aggregation hash value is, for example, 32 bytes.

For example, the generation apparatus 100 respectively aggregates the hash value A, the hash value B, and the hash value C into an initialized aggregation hash value by an EOR operation so as to generate the aggregation hash value. The initialization is, for example, setting each bit to 0. The generation apparatus 100 may generate, as the key 620, an aggregation hash value obtained by aggregating the hash value A, the hash value B, and the hash value C by an arithmetic operation such as addition or subtraction.

Thus, the generation apparatus 100 may distribute head information of the content 600 to the three blocks 610, so that it is difficult for an attacker to generate a key that collides with the key 620 generated this time. For example, the generation apparatus 100 may cause a partial change of the content 600 to entirely affect each block 610 of the three blocks 610. Therefore, it is difficult for the attacker to partially change the content 600 and to generate a key that collides with the key 620 generated this time.

The generation apparatus 100 combines the generated key 620 with the content 600 so as to generate a hash value corresponding to the combined content 600 as the total hash value. The generation apparatus 100 outputs the generated total hash value.

Thus, the generation apparatus 100 may generate total hash values which are unlikely to collide with each other. Since the generation apparatus 100 uses the key 620 which is unlikely to collide, it is able to be difficult for the attacker to cause the total hash value corresponding to the content 600 to collide with the total hash value corresponding to other contents on purpose.

Figure 7:
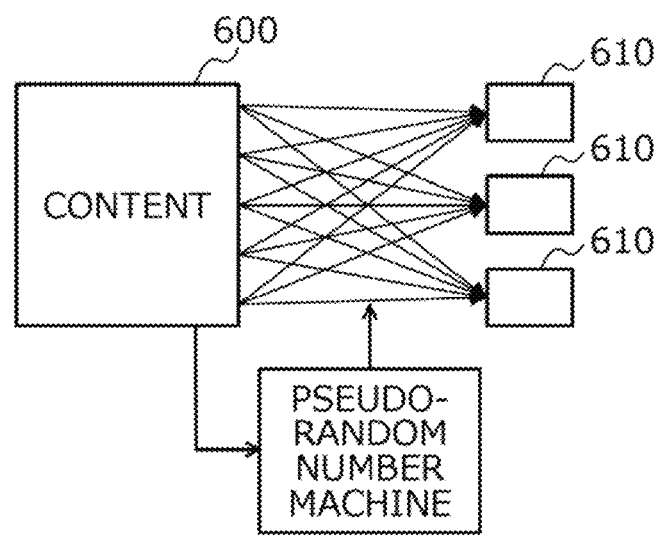
FIG. 7 is an explanatory diagram (part 2) illustrating the example of the operation of the generation apparatus.

Next, description continues with reference to FIG. 7, and an example in which the generation apparatus 100 divides the content 600 into the three blocks 610 will be specifically described.

In FIG. 7, the generation apparatus 100 acquires the number of divisions. The number of divisions is preferably a prime number. For example, as the number of divisions, the generation apparatus 100 adopts a prime number close to a result obtained by dividing a size of the content 600 by a standard size of the block 610, based on the standard size of the block 610 in accordance with a rule for obtaining the prime number to be the number of divisions. The rule for obtaining the prime number as the number of divisions is to obtain an identical prime number as the number of divisions for the contents 600 having identical sizes. It is preferable that the generation apparatus 100 have one rule for obtaining a prime number as the number of divisions and the rule for obtaining the prime number as the number of divisions be not changed. For example, the generation apparatus 100 sets a standard size of the block 610 to 1 MB, and when the size of the content 600 is 16 MB, a prime number 17 close to 16

MB/1 MB=16 is adopted as the number of divisions. In the example in FIG. 7, the generation apparatus 100 employs the number of divisions of 3.

The generation apparatus 100 sections the content 600 from a head of the content 600, and specifies a plurality of pieces of partial data each of which is a designated length unit. The designated length is, for example, 1 bit. The generation apparatus 100 divides the content 600 into the three blocks 610 by allocating and adding the respective pieces of partial data to the three blocks 610 in accordance with a predetermined order.

For example, the generation apparatus 100 generates a hash value from the head location of the content 600, and allocates the respective pieces of partial data to the three blocks 610 in accordance with an order defined by the pseudo-random number machine using the generated hash value as a seed. For example, the generation apparatus 100 may allocate the respective pieces of partial data to the three blocks 610 in accordance with an order of numbers which are allocated to the blocks.

Although the case where the designated length is fixed is described herein, the embodiment is not limited thereto. For example, the designated length may be variable. For example, there may be a case where the designated length is relatively short when a head side of the content 600 is sectioned, and the designated length is relatively long when an end side of the content 600 is sectioned. Next, description continues with reference to FIG. 8, and a result of division will be described.

Figure 8:
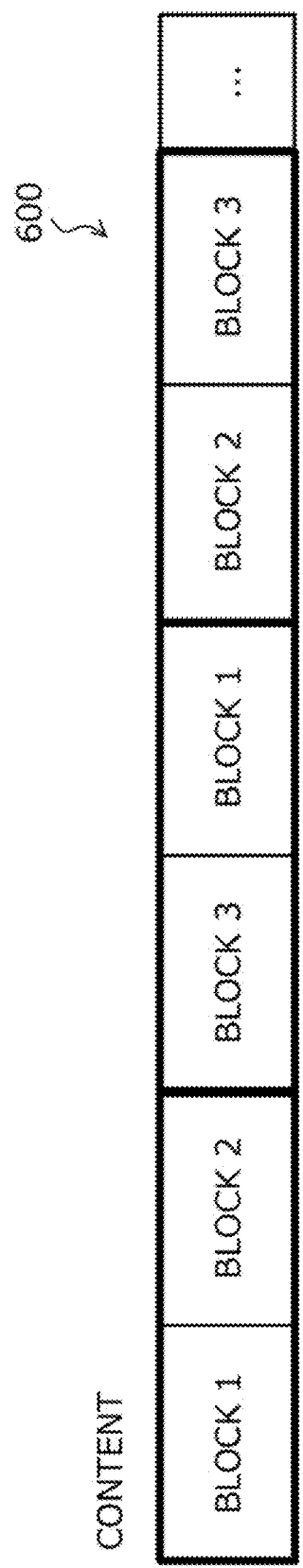
FIG. 8 is an explanatory diagram (part 3) illustrating the example of the operation of the generation apparatus.

FIG. 8 illustrates a case where partial data included in the content 600 is allocated to any block 610, as a result of dividing the content 600. As illustrated in FIG. 8, since the number of divisions is 3 which is a prime number, it is able to be difficult for the generation apparatus 100 to arbitrarily control to which block 610 the partial data included in the content 600 is allocated.

In the example in FIG. 6, the case where the generation apparatus 100 combines the key 620 with the content 600, and generates and outputs a total hash value corresponding to the content 600 after the combination is described, and the embodiment is not limited thereto. For example, the generation apparatus 100 may combine the key 620 with the content 600, generate the total hash value corresponding to the combined content 600, and output the total hash value together with the key 620. Thus, the generation apparatus 100 may use the generated total hash value together with the key 620. Therefore, the generation apparatus 100 may improve accuracy of a coincide determination of the contents 600 based on the total hash value.

In the example in FIG. 6, the case where the generation apparatus 100 generates the aggregation hash value having the identical length as each of the hash value A, the hash value B, and the hash value C by the EOR operation is described, and the embodiment is not limited thereto. For example, there may be a case where the generation apparatus 100 generates an aggregation hash value which has a length longer than a length of any one of the hash value A, the hash value B, and the hash value C, by the EOR operation. Description continues with reference to FIG. 9, and a specific example corresponding to this case will be described.

Figure 9:
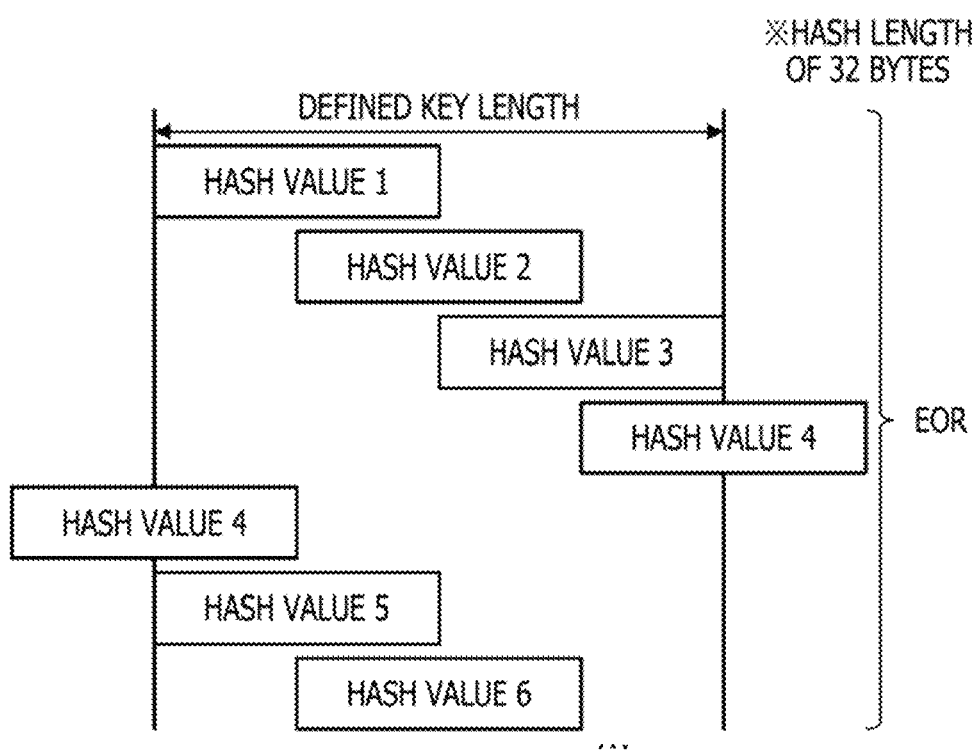
FIG. 9 is an explanatory diagram (part 4) illustrating the example of the operation of the generation apparatus.

In FIG. 9, the generation apparatus 100 aggregates the hash values of the respective blocks 610 with the initialized aggregation hash value while shifting the hash values, by an EOR operation. A magnitude of the shifting is, for example, 16 bytes. In the example in FIG. 9, a length of the hash value of each block 610 is 32 bytes. A length of the aggregation hash value is 64 bytes.

For example, the generation apparatus 100 sets 32 bytes from a head of the initialized aggregation hash value, as an integration location, and aggregates the hash value 1 with the set integration location by the EOR operation. Next, for example, the generation apparatus 100 shifts the integration location by 16 bytes toward an end side and aggregates the hash value 2 with the shifted integration location by the EOR operation. Next, for example, the generation apparatus 100 shifts the integration location by 16 bytes toward the end side, and then aggregates the hash value 3 with the shifted integration location by the EOR operation.

Next, for example, the generation apparatus 100 shifts the integration location by 16 bytes toward the end side. At this time, the generation apparatus 100 sets the 16 bytes protruding from an end to a head, of the integration location. The generation apparatus 100 aggregates the hash value 4 with the shifted integration location, by the EOR operation. Next, for example, the generation apparatus 100 shifts the integration location by 16 bytes toward the end side. At this time, since all of the integration locations protrude from the end, the generation apparatus 100 sets the integration location at the head of the content 600. The generation apparatus 100 aggregates the hash value 5 with the shifted integration location, by the EOR operation.

Thereafter, in the same manner, the generation apparatus 100 generates an aggregation hash value by aggregating the hash values of the blocks 610 with the aggregation hash value. Thus, the generation apparatus 100 may easily avoid a collision of the aggregation hash values. For example, the generation apparatus 100 may reduce that an aggregation hash value corresponding to another content collides with the aggregation hash value corresponding to the content 600 on purpose, by the attacker.

In the example in FIG. 6, the case where the generation apparatus 100 combines the generated key 620 with the content 600 and generates a total hash value for the combined content 600 is described, and the embodiment is not limited thereto. For example, there may be a case where the generation apparatus 100 combines the generated key 620 with integration data obtained by integrating the respective blocks 610, and generates a total hash value for the integration data after the combination. Description continues with reference to FIG. 10, and a specific example corresponding to this case will be described.

Figure 10:
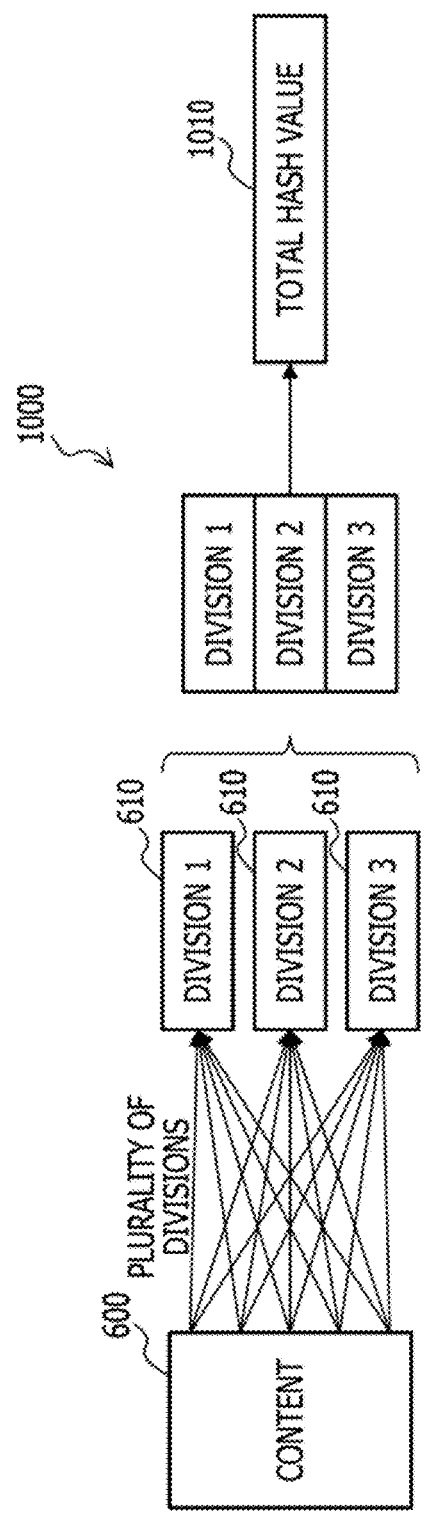
FIG. 10 is an explanatory diagram (part 5) illustrating the example of the operation of the generation apparatus.

In FIG. 10, the generation apparatus 100 couples a plurality of blocks 610 so as to generate an integrated content 1000 in which the plurality of blocks 610 are integrated. The generation apparatus 100 combines the generated key 620 with the integrated content 1000, and generates a total hash value 1010 for the combined integrated content 1000 by using a hash function. Thus, the generation apparatus 100 may easily avoid a collision between the total hash values 1010. For example, the generation apparatus 100 may reduce that a total hash value corresponding to another content collides with the total hash value 1010 corresponding to the content 600 on purpose, by the attacker.

Specific Example of Operation of Generation Apparatus 100

Next, a specific example of an operation of the generation apparatus 100 will be described with reference to FIGS. 11 to 17.

Figure 11:
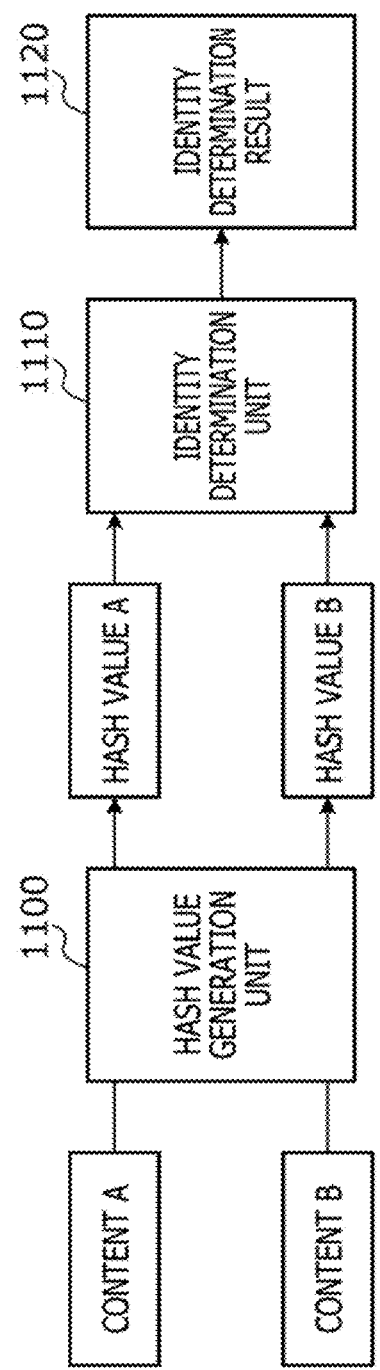
FIG. 11 is an explanatory diagram (part 1) illustrating a specific example of the operation of the generation apparatus.

FIGS. 11 to 17 are explanatory diagrams illustrating a specific example of an operation of the generation apparatus 100. In FIG. 11, the generation apparatus 100 includes a hash value generation unit 1100 and an identity determination unit 1110.

For example, the hash value generation unit 1100 generates the hash value A of the content A, and generates the hash value B of the content B. The identity determination unit 1110 determines whether or not the hash value A of the content A and the hash value B of the content B are identical values. When the values are identical, the identity determination unit 1110 determines that the content A and the content B are identical contents. On the other hand, when the values are not identical, the identity determination unit 1110 determines that the content A and the content B are not identical contents.

The identity determination unit 1110 outputs a result of determining whether or not the content A and the content B are identical contents, as the identity determination result 1120. Thus, the generation apparatus 100 may determine an identity of the content. Next, description continues with reference to FIG. 12, and a specific content of the hash value generation unit 1100 will be described.

Figure 12:
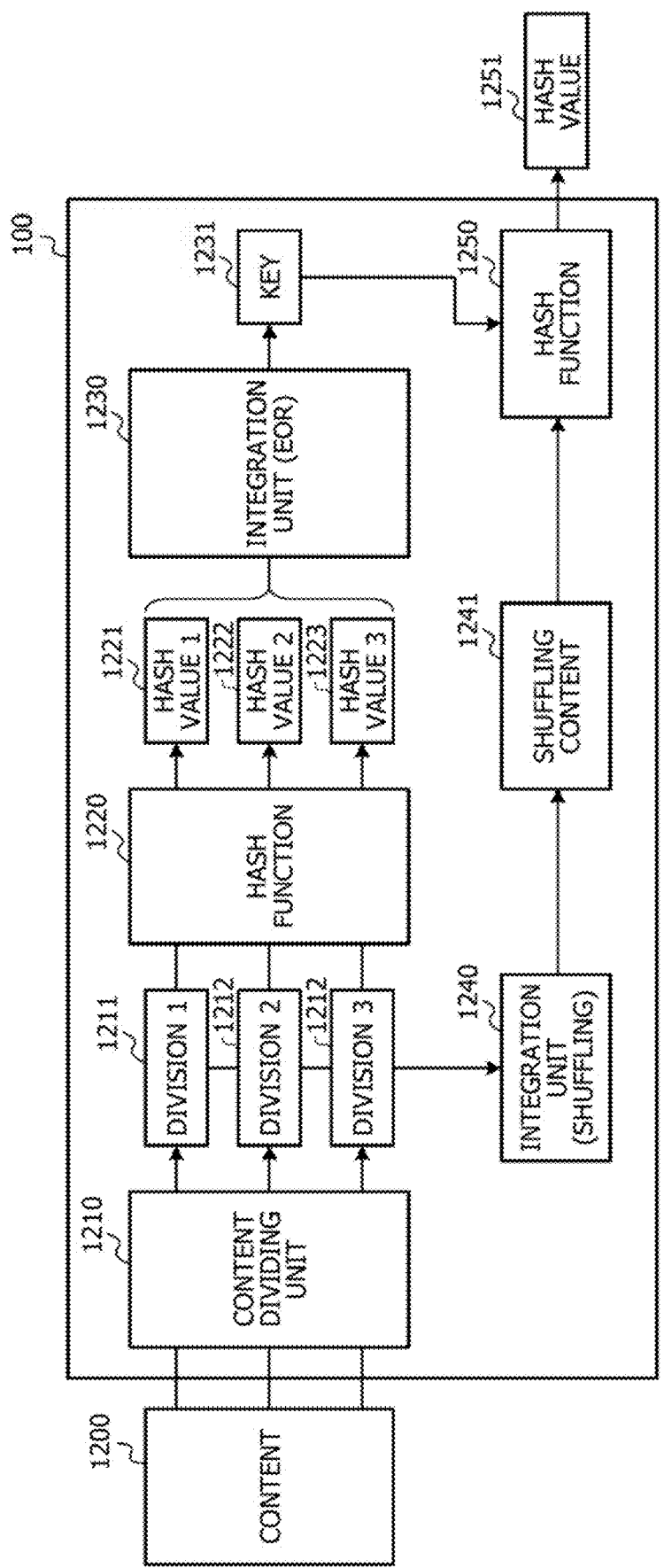
FIG. 12 is an explanatory diagram (part 2) illustrating the specific example of the operation of the generation apparatus.

In FIG. 12, the generation apparatus 100 includes a content dividing unit 1210, a hash function 1220, an integration unit 1230, an integration unit 1240, and a hash function 1250. The hash value generation unit 1100 is realized by, for example, the content dividing unit 1210, the hash function 1220, the integration unit 1230, the integration unit 1240, and the hash function 1250.

The generation apparatus 100 acquires a content 1200. The generation apparatus 100 causes the content dividing unit 1210 to divide the content 1200 into three blocks 1211 to 1213. The generation apparatus 100 generates hash values 1221 to 1223 corresponding to the respective blocks 1211 to 1213 by using the hash function 1220. The generation apparatus 100 causes the integration unit 1230 to generate, as a key 1231, an aggregation hash value obtained by aggregating the hash values 1221 to 1223 by the EOR operation.

The generation apparatus 100 causes the integration unit 1240 to sequentially couple the three blocks 1211 to 1213 and to generate a shuffling content 1241. The generation apparatus 100 combines the key 1231 with the shuffling content 1241, and generates a hash value 1251 corresponding to the combined shuffling content 1241 by using the hash function 1250. Thus, the generation apparatus 100 may generate the hash value 1251 with which a collision is unlikely to occur. Next, description continues with reference to FIGS. 13 to 17, and a specific example in which the generation apparatus 100 generates the hash value 1251 will be described.

Figure 13:
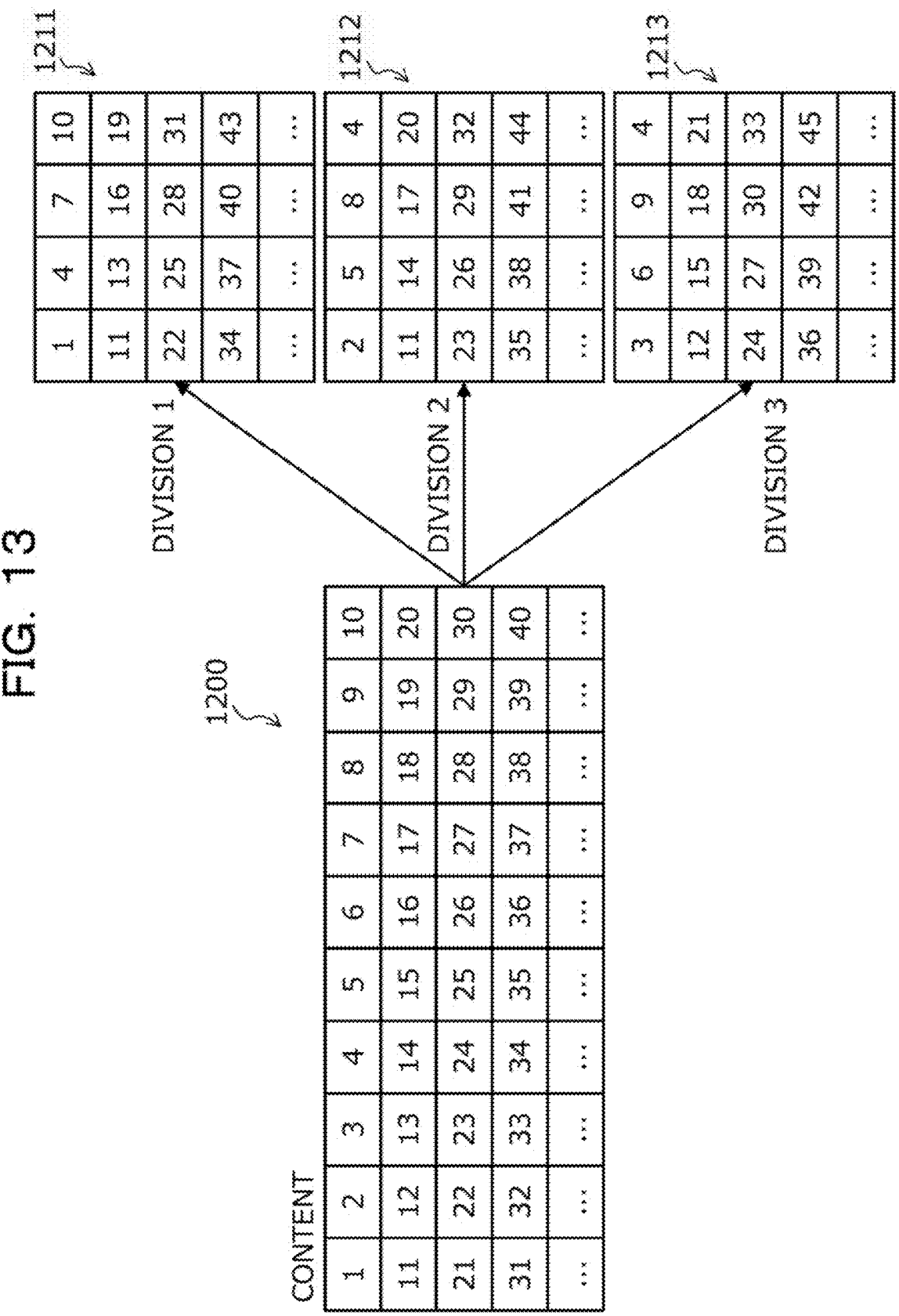
FIG. 13 is an explanatory diagram (part 3) illustrating the specific example of the operation of the generation apparatus.

In FIG. 13, the generation apparatus 100 allocates the content 1200 to the three blocks 1211 to 1213 in units of 1 byte.

The generation apparatus 100 prepares, for example, the three empty blocks 1211 to 1213. For example, the generation apparatus 100 allocates a first byte from a head of the content 1200 to a first byte of the block 1211 and adds the first byte to the block 1211. For example, the generation apparatus 100 allocates a second byte from the head of the content 1200 to a first byte of the block 1212 and adds the second byte to the block 1212. For example, the generation apparatus 100 allocates a third byte from the head of the content 1200 to a first byte of the block 1213 and adds the third byte to the block 1213.

Thereafter, in the same manner, the generation apparatus 100 allocates the data in units of each one byte of the content 1200 to any of the blocks 1211 to 1213. Thus, the generation apparatus 100 may divide the content 1200 into the three blocks 1211 to 1213. At this time, the generation apparatus 100 may distribute the head information of the content 1200 to the three blocks 1211 to 1213. Next, description continues with reference to FIG. 14.

Figure 14:
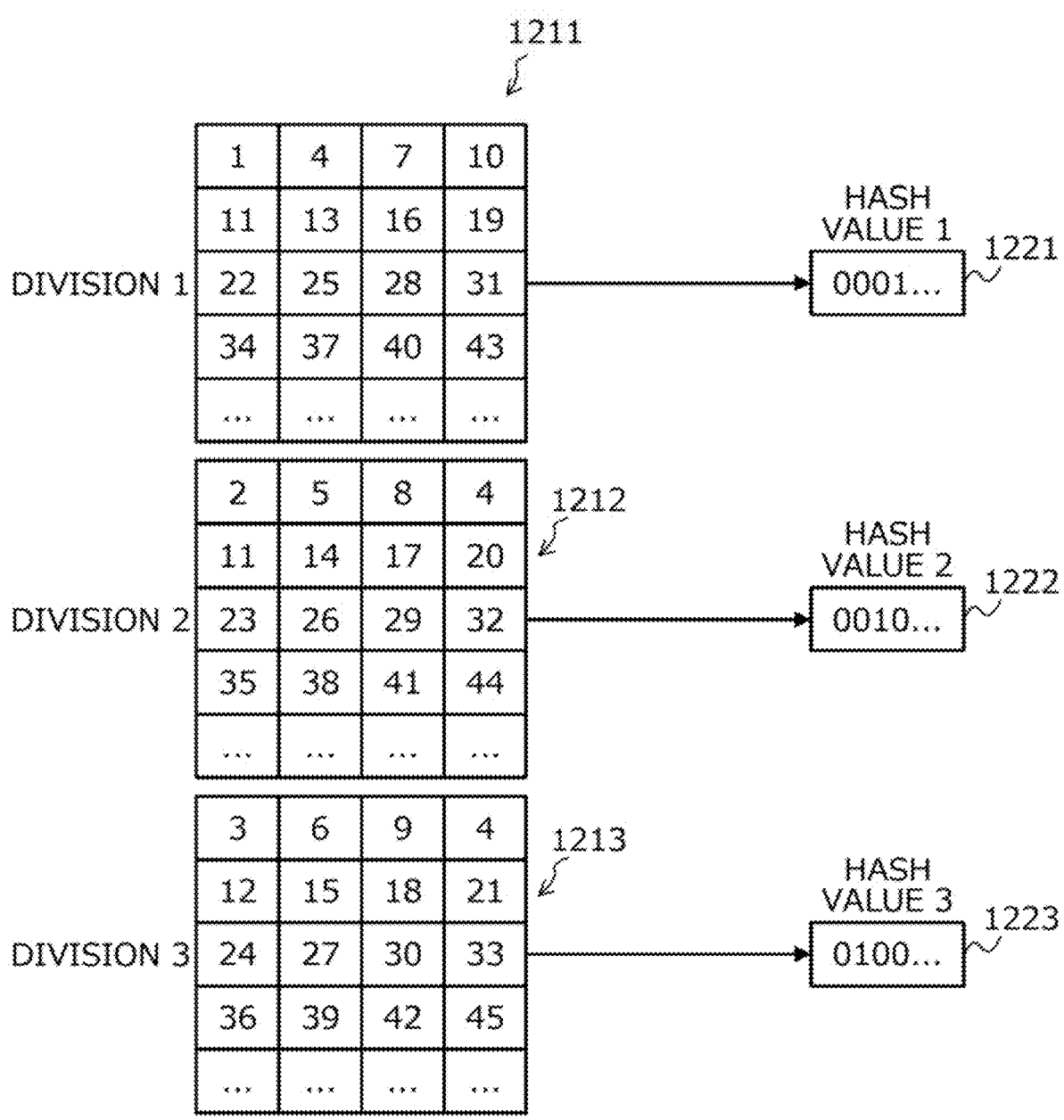
FIG. 14 is an explanatory diagram (part 4) illustrating the specific example of the operation of the generation apparatus.

In FIG. 14, the generation apparatus 100 generates the hash values 1221 to 1223 respectively corresponding to the blocks 1211 to 1213 by using the hash function 1220. Next, description continues with reference to FIG. 15.

Figure 15:
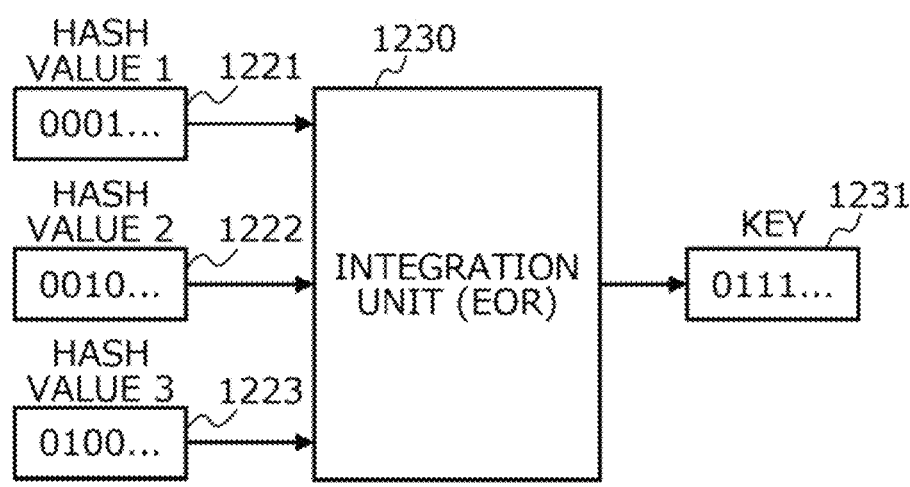
FIG. 15 is an explanatory diagram (part 5) illustrating the specific example of the operation of the generation apparatus.

In FIG. 15, the generation apparatus 100 causes the integration unit 1230 to aggregate the hash values 1221 to 1223 by using an EOR operation, and to generate an aggregation hash value having an identical length with a length of each of the hash values 1221 to 1223 as the key 1231. Thus, the generation apparatus 100 may generate the key 1231 which is unlikely to collide, based on the three blocks 1211 to 1213 in which the head information of the content 1200 is distributed. Next, description continues with reference to FIG. 16.

Figure 16:
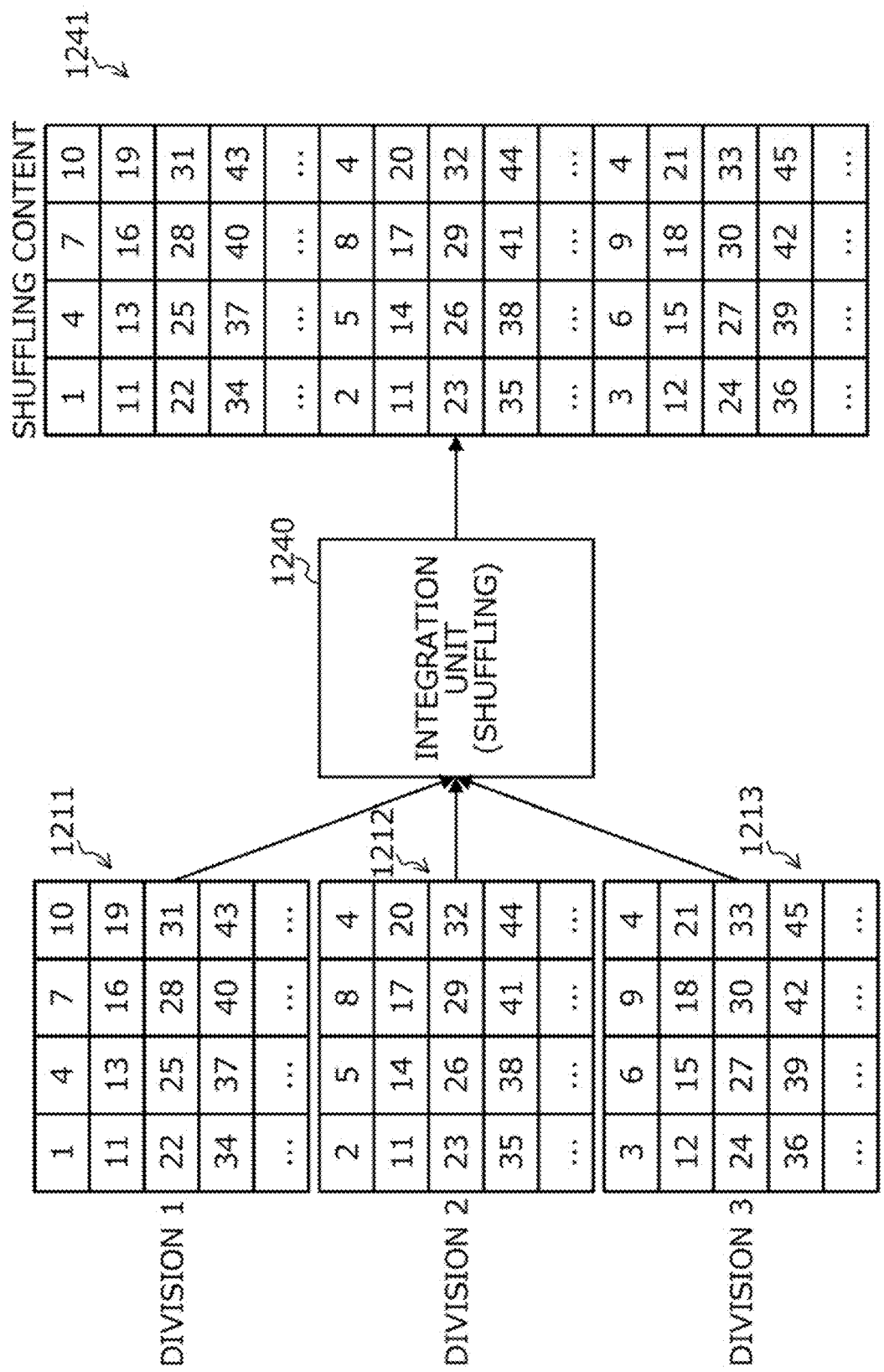
FIG. 16 is an explanatory diagram (part 6) illustrating the specific example of the operation of the generation apparatus.

In FIG. 16, the generation apparatus 100 causes the integration unit 1240 to sequentially couple the three blocks 1211 to 1213, and to generate the shuffling content 1241. Thus, the generation apparatus 100 may distribute the head information of the content 1200 into a plurality of locations in the shuffling content 1241. Next, description continues with reference to FIG. 17.

Figure 17:
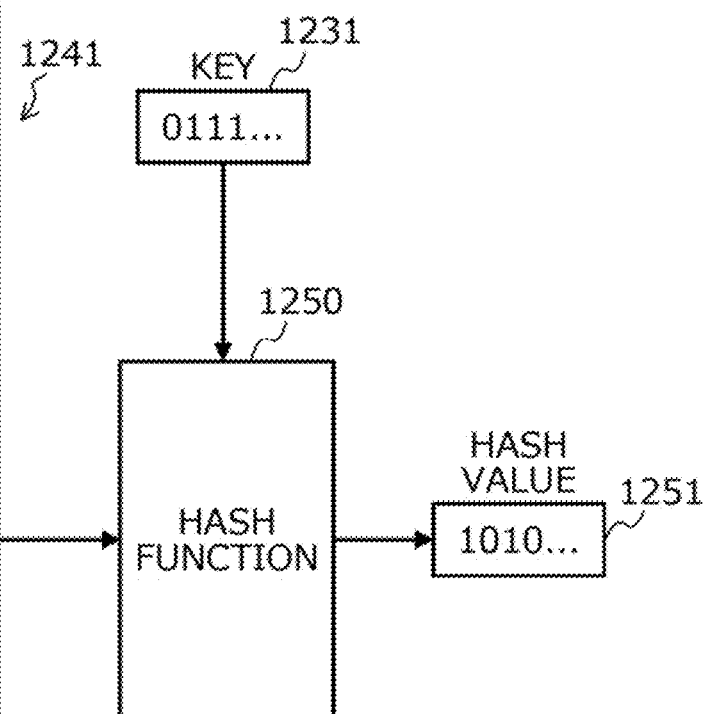
FIG. 17 is an explanatory diagram (part 7) illustrating the specific example of the operation of the generation apparatus.

In FIG. 17, the generation apparatus 100 combines the key 1231 with the shuffling content 1241, and generates the hash value 1251 corresponding to the combined shuffling content 1241 by using the hash function 1250. Thus, the generation apparatus 100 may generate the hash value 1251 with which a collision is unlikely to occur.

For example, since the key 1231 which is unlikely to collide is used, the generation apparatus 100 may generate the hash value 1251 which is unlikely to collide. For example, since the generation apparatus 100 uses the shuffling content 1241 in which the head information of the content 1200 is distributed, it is possible to generate the hash value 1251 which is unlikely to collide. For example, the generation apparatus 100 may reduce that attacker to find another content different from the content 1200, with which an identical value with the hash value 1251 may be generated as the hash value.

For example, the generation apparatus 100 distributes the head information of the content 1200 to a plurality of blocks 1211 to 1213 and distributes the head information in the shuffling content 1241. Therefore, the attacker may not find the other content different from the content 1200, with which an identical value with the hash value 1251 may be generated as the hash value, by relying on the head information of the content 1200.

Another Specific Example of Operation of Generation Apparatus 100

Next, another specific example of the operation of the generation apparatus 100 will be described with reference to FIG. 18.

Figure 18:
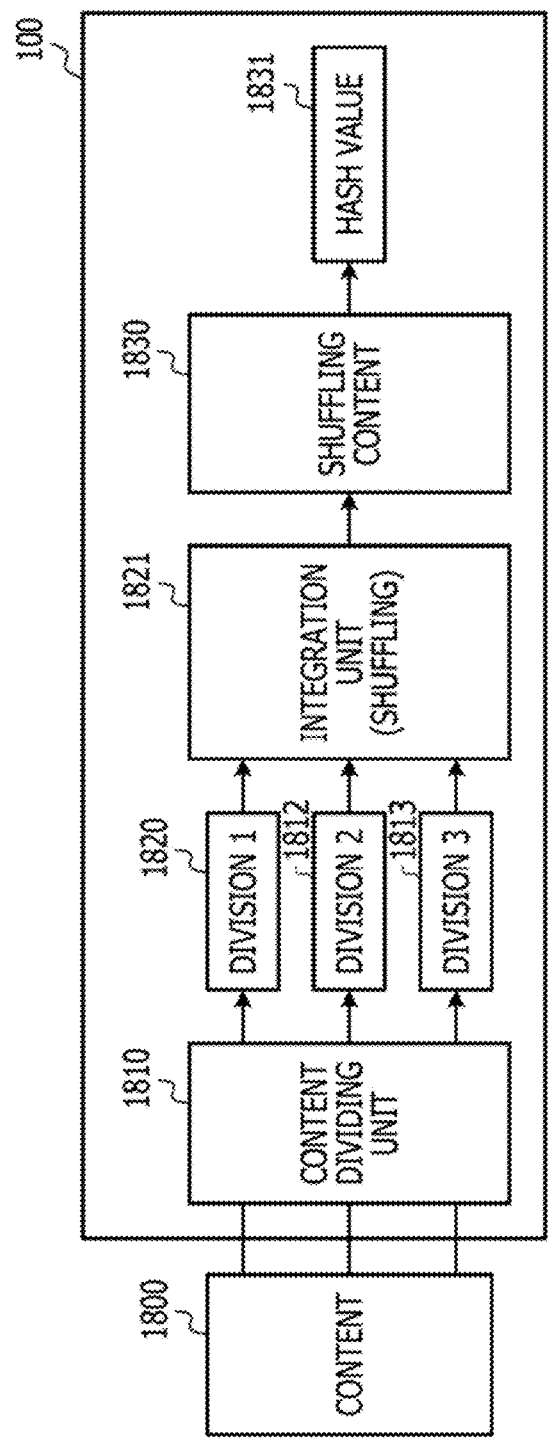
FIG. 18 is an explanatory diagram illustrating another specific example of the operation of the generation apparatus.

FIG. 18 is an explanatory diagram illustrating another specific example of the operation of the generation apparatus 100. In FIG. 18, the generation apparatus 100 includes a content dividing unit 1810, an integration unit 1820, and a hash function 1830.

The generation apparatus 100 acquires a content 1800. The generation apparatus 100 causes the content dividing unit 1810 to divide the content 1800 into three blocks 1811 to 1813. The generation apparatus 100 causes the integration unit 1820 to sequentially couple the three blocks 1811 to 1813, and to generate a shuffling content 1821. The generation apparatus 100 generates a hash value 1831 corresponding to the generated shuffling content 1821 by using the hash function 1830.

Thus, the generation apparatus 100 may generate the hash value 1831 with which a collision is unlikely to occur. The generation apparatus 100 may generate the hash value 1831 in a state where head information of the content 1800 is distributed in the shuffling content 1821. Therefore, the attacker may not find another content different from the content 1800, with which an identical value with the hash value 1831 may be generated as the hash value, by relying on the head information of the content 1800.

Entire Process Procedure

Next, an example of an entire process procedure to be executed by the generation apparatus 100 will be described with reference to FIG. 19. The entire process is implemented by, for example, the CPU 401, the storage areas such as the memory 402, the recording medium 405, and the network I/F 403 illustrated in FIG. 4.

Figure 19:
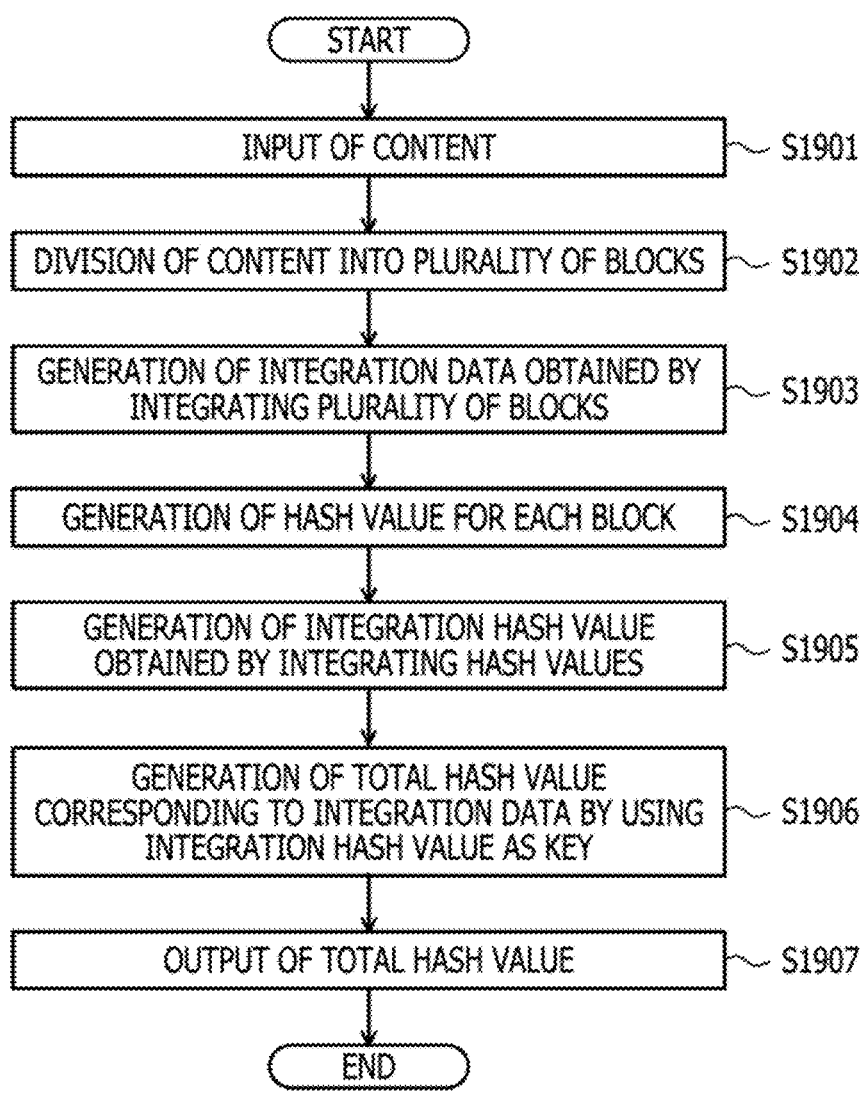
FIG. 19 is a flowchart illustrating an example of an entire process procedure.

FIG. 19 is a flowchart illustrating an example of the entire process procedure. In FIG. 19, the generation apparatus 100 accepts an input of a content (step S1901).

Next, the generation apparatus 100 executes a division process, which will be described later in FIG. 20, so as to divide the content into a plurality of blocks (step S1902). The generation apparatus 100 executes a content integration process, which will be described later with reference to FIG. 21, so as to generate integration data obtained by integrating the plurality of divided blocks (step S1903).

Next, the generation apparatus 100 executes a generation process, which will be described later with reference to FIG. 22, so as to generate a hash value for each block (step S1904). The generation apparatus 100 executes a hash value integration process, which will be described later with reference to FIG. 23, so as to generate an aggregation hash value obtained by aggregating the generated hash values as a key (step S1905).

Next, the generation apparatus 100 generates a total hash value corresponding to the generated integration data by using the generated aggregation hash value as a key (step S1906). The generation apparatus 100 outputs the generated total hash value (step S1907). After that, the generation apparatus 100 ends the entire process.

Division Process Procedure

Next, an example of a division process procedure to be executed by the generation apparatus 100 will be described with reference to FIG. 20. The division process is implemented by, for example, the CPU 401, the storage areas such as the memory 402, the recording medium 405, and the network I/F 403 illustrated in FIG. 4.

Figure 20:
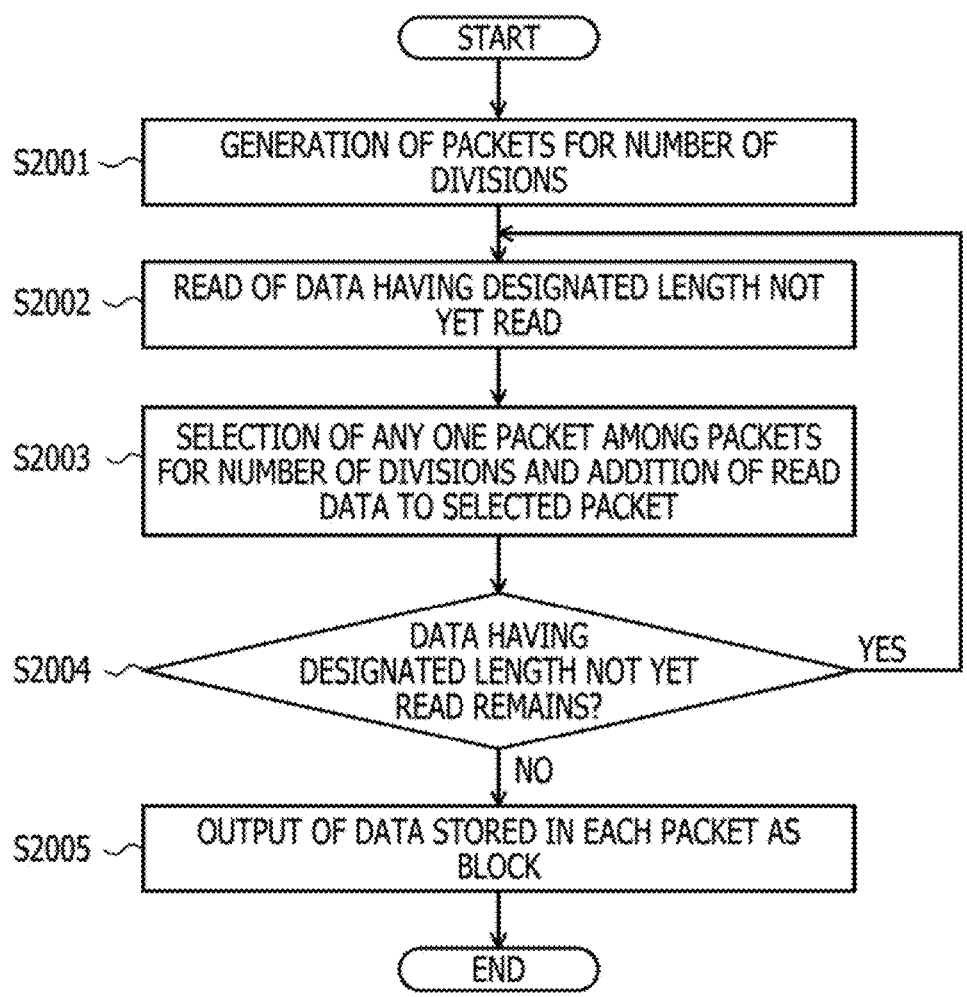
FIG. 20 is a flowchart illustrating an example of a division process procedure.

FIG. 20 is a flowchart illustrating an example of the division process procedure. In FIG. 20, the generation apparatus 100 generates buckets for the number of divisions (step S2001).

Next, from a plurality of partial data sectioned into designated length units from a head of a content, the generation apparatus 100 reads data having the designated length, which is not read yet, in accordance with an order from the head of the content (step S2002). The generation apparatus 100 selects, in accordance with an order of the buckets, any one of the buckets for the number of divisions and adds the read data to the selected bucket (step S2003).

Next, the generation apparatus 100 determines whether or not data having the designated length, which is not read yet, remains in the content (step S2004). In a case where the data having the designated length, which is not read, remains (Yes in step S2004), the generation apparatus 100 returns to the process in step S2002. On the other hand, in a case where all the data pieces having the designated length are read (No in step S2004), the generation apparatus 100 proceeds to the process in step S2005.

In step S2005, the generation apparatus 100 outputs the data stored in each bucket, as a block (step S2005). The generation apparatus 100 ends the division process.

Content Integration Process Procedure

Next, with reference to FIG. 21, an example of a content integration process procedure to be executed by the generation apparatus 100 will be described. The content integration process is implemented, for example, by the CPU 401, the storage area such as the memory 402 and the recording medium 405, and the network I/F 403 illustrated in FIG. 4.

Figure 21:
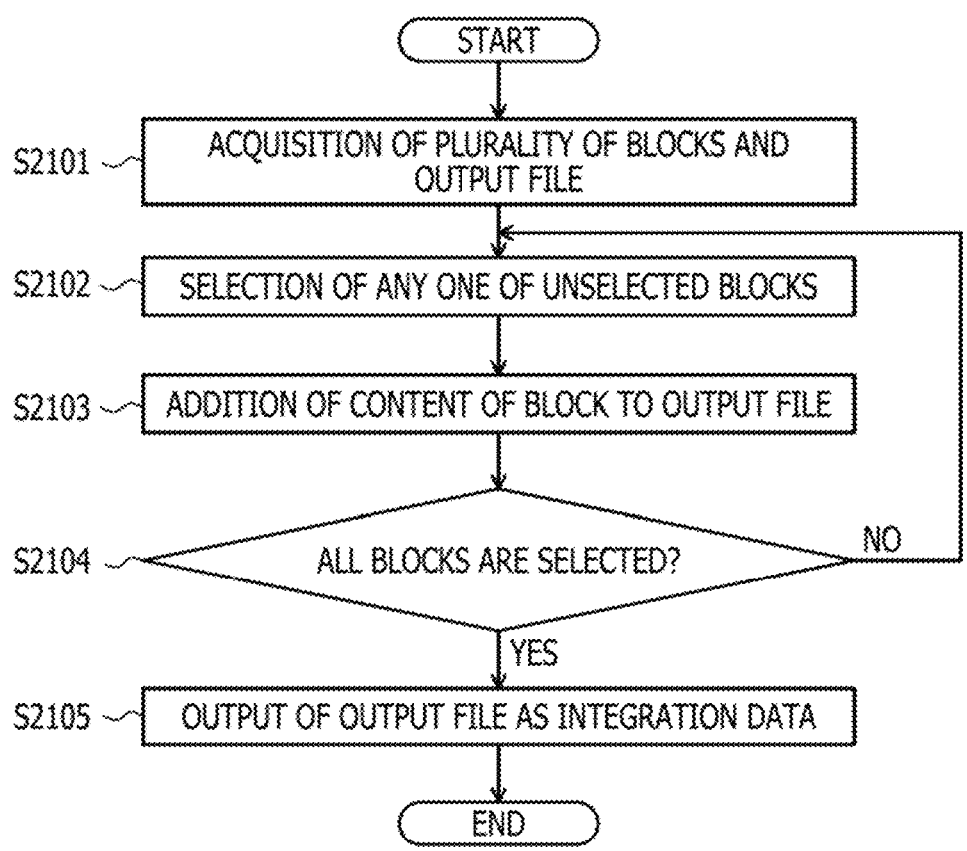
FIG. 21 is a flowchart illustrating an example of a content integration process procedure.

FIG. 21 is a flowchart illustrating an example of a content integration process procedure. In FIG. 21, the generation apparatus 100 acquires a plurality of blocks and an output file (step S2101).

Next, the generation apparatus 100 selects any one of unselected blocks among the plurality of blocks in accordance with an order of the blocks (step S2102). The generation apparatus 100 adds a content of the selected block to the output file (step S2103).

Next, the generation apparatus 100 determines whether or not all the blocks are selected (step S2104). In a case where any unselected block remains (No in step S2104), the generation apparatus 100 returns to the process in step S2102. On the other hand, in a case where all the blocks are selected (Yes in step S2104), the generation apparatus 100 proceeds to the process in step S2105.

In step S2105, the generation apparatus 100 outputs the output file as integration data (step S2105). The generation apparatus 100 ends the content integration process.

Generation Process Procedure

Next, an example of a generation process procedure to be executed by the generation apparatus 100 will be described with reference to FIG. 22. The generation process is implemented, for example, by the CPU 401, the storage area such as the memory 402 and the recording medium 405, and the network I/F 403 illustrated in FIG. 4.

FIG. 22 is a flowchart illustrating an example of the generation process procedure. In FIG. 22, the generation apparatus 100 acquires a plurality of blocks (step S2201).

Next, the generation apparatus 100 selects any one of unselected blocks among the plurality of blocks, in accordance with an order of the blocks (step S2202). The generation apparatus 100 generates a hash value of the selected block by using a hash function (step S2203).

Next, the generation apparatus 100 determines whether or not all the blocks are selected (step S2204). In a case where any unselected block remains (No in step S2204), the generation apparatus 100 returns to the process in step S2202. On the other hand, in a case where all the blocks are selected (Yes in step S2204), the generation apparatus 100 proceeds to the process in step S2205.

In step S2205, the generation apparatus 100 outputs the hash value for each block (step S2205). The generation apparatus 100 ends the generation process.

Hash Value Integration Process Procedure

Next, with reference to FIG. 23, an example of a hash value integration process procedure to be executed by the generation apparatus 100 will be described. The hash value integration process is implemented, for example, by the CPU 401, the storage area such as the memory 402 and the recording medium 405, and the network I/F 403 illustrated in FIG. 4.

FIG. 23 is a flowchart illustrating an example of the hash value integration process procedure. In FIG. 23, the generation apparatus 100 acquires a hash value for each block (step S2301).

Next, the generation apparatus 100 initializes an aggregation hash value (step S2302). The generation apparatus 100 selects a hash value of any one of unselected blocks among the hash values for the respective blocks, in accordance with an order of the blocks (step S2303).

Next, the generation apparatus 100 combines the selected hash value with the aggregation hash value by using an EOR operation (step S2304). The generation apparatus 100 determines whether or not the hash values of all the blocks are selected (step S2305).

In a case where the hash value of the unselected block remains (No in step S2305), the generation apparatus 100 returns to the process in step S2303. On the other hand, in a case where the hash values of all the blocks are selected (Yes in step S2305), the generation apparatus 100 proceeds to the process in step S2306.

In step S2306, the generation apparatus 100 outputs the aggregation hash value as a key (step S2306). The generation apparatus 100 ends the hash value integration process.

The generation apparatus 100 may change and execute an order of the processes in some steps in each flowchart illustrated in FIGS. 19 to 23. For example, the order of the process in step S1903 may be changed with the processes in step S1904 and step S1905. The generation apparatus 100 may omit the process in some steps in each flowchart in FIGS. 19 to 23. For example, the process in step S1905 may be omitted.

As described above, according to the generation apparatus 100, it is possible to divide a target content into a plurality of blocks according to a predetermined rule. The generation apparatus 100 may generate a hash value corresponding to each of the plurality of divided blocks. The generation apparatus 100 may generate an aggregation hash value obtained by aggregating the generated hash values. The generation apparatus 100 may output the generated aggregation hash value. Thus, the generation apparatus 100 may reduce a probability that a collision occurs for the hash value corresponding to the target content.

According to the generation apparatus 100, it is possible to generate a total hash value corresponding to the entire target content by using the generated aggregation hash value as a key. The generation apparatus 100 may output the generated total hash value. Thus, the generation apparatus 100 may reduce the probability that a collision occurs for the hash value corresponding to the target content. With the generation apparatus 100, it is possible to use the hash value based on the key.

According to the generation apparatus 100, it is possible to generate the total hash value based on the integration data obtained by integrating the plurality of divided blocks by using the generated aggregation hash value as a key. Thus, the generation apparatus 100 may further reduce the probability that a collision occurs for the hash value corresponding to the target content.

According to the generation apparatus 100, it is possible to use a rule that, in a case where the target content is sectioned into designated length units, each of data pieces having the designated length included in the target content is allocated to each of the plurality of blocks according to a predetermined order. Thus, the generation apparatus 100 may distribute head information of the content to each of the plurality of blocks. Therefore, the generation apparatus 100 may further reduce the probability that a collision occurs for the hash value corresponding to the target content.

According to the generation apparatus 100, it is possible to adopt an order defined by a pseudo-random number machine based on a seed in a predetermined order. Thus, with a random number, the generation apparatus 100 may make it difficult to analyze the rule that the head information of the content is distributed to each of the plurality of blocks. Therefore, the generation apparatus 100 may further reduce the probability that a collision occurs for the hash value corresponding to the target content.

According to the generation apparatus 100, it is possible to adopt a value generated based on a predetermined location of the target content as a seed. Thus, the generation apparatus 100 may further reduce the probability that a collision occurs for the hash value corresponding to the target content without fixing the seed.

The generation apparatus 100 may use a prime number as the designated length. Thus, the generation apparatus 100 may further reduce the probability that a collision occurs for the hash value corresponding to the target content.

According to the generation apparatus 100, it is possible to generate an aggregation hash value by an EOR operation. Thus, the generation apparatus 100 may reduce a process amount desirable when generating the aggregation hash value.

According to the generation apparatus 100, it is possible to generate the aggregation hash value having a data length longer than a data length of the generated hash value. Thus, the generation apparatus 100 may further reduce the probability that a collision occurs for the hash value corresponding to the target content.

According to the generation apparatus 100, it is possible to adopt the number of blocks which is a prime number, as the plurality of blocks. Thus, the generation apparatus 100 may further reduce the probability that a collision occurs for the hash value corresponding to the target content.

According to the generation apparatus 100, it is possible to divide the target content into the plurality of blocks according to a predetermined rule. According to the generation apparatus 100, it is possible to generate the total hash value corresponding to the entire target content based on the integration data obtained by integrating the plurality of divided blocks. Thus, the generation apparatus 100 may reduce a probability that a collision occurs for the hash value corresponding to the target content.

According to the generation apparatus 100, it is possible to use a rule that, in a case where the target content is sectioned into designated length units, each of the data pieces having the designated length included in the target content is allocated to each of the plurality of blocks according to a predetermined order. Thus, the generation apparatus 100 may distribute head information of the content to each of the plurality of blocks. Therefore, the generation apparatus 100 may further reduce the probability that a collision occurs for the hash value corresponding to the target content.

The generation method described in the present embodiment may be realized by executing a previously prepared program with a computer such as a PC or a workstation. The generation program described in the present embodiment is recorded in a computer-readable recording medium and is executed by being read from the recording medium by a computer. The recording medium is a hard disc, a flexible disc, a compact disc (CD)-ROM, a magneto optical disc (MO), a Digital Versatile Disc (DVD), or the like. The generation program described in the present embodiment may be distributed via a network, such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a generation program for causing a computer to execute a process, the process comprising:
    dividing a target content into a plurality of blocks so that head information of the target content is distributed to the blocks different from each other, according to a predetermined rule;
    generating a hash value corresponding to each of the plurality of divided blocks;
    generating, by aggregating the generated hash values using an exclusive OR operation (EOR) operation, an aggregation hash value having an identical length with a length of each of the generated hash values;
    generating a shuffling content by sequentially coupling and integrating the plurality of divided block;
    combining the aggregation hash value to the shuffling content;
    generating a total hash value by performing a hash function on the shuffling content to which the aggregation hash value is combined while using the aggregation hash value as a key which is based on the plurality of blocks in which head information of the target content is distributed; and
    outputting the generated total hash value corresponding to the shuffling content to which the aggregation hash value is combined.

2. The non-transitory computer-readable recording medium according to claim 1, wherein the predetermined rule is a rule for dividing, in a case where the target content is sectioned into designated length units, the target content into the plurality of blocks by allocating each data having the designated length included in the target content to each of the plurality of blocks, according to a predetermined order.

3. The non-transitory computer-readable recording medium according to claim 2, wherein the predetermined order is an order defined by a pseudo-random number machine based on a seed.

4. The non-transitory computer-readable recording medium according to claim 3, wherein the seed is generated based on a predetermined location of the target content.

5. The non-transitory computer-readable recording medium according to claim 4, wherein the designated length is a prime number.

6. The non-transitory computer-readable recording medium according to claim 1, wherein in the generating the aggregation hash value, the aggregation hash value having a data length longer than a data length of the generated hash value is generated.

7. The non-transitory computer-readable recording medium according to claim 1, wherein the plurality of blocks are blocks of a number which is a prime number.

8. A generation apparatus comprising:
    a memory; and
    a processor coupled to the memory and configured to:
        divide a target content into a plurality of blocks so that head information of the target content is distributed to the blocks different from each other, according to a predetermined rule;
        generate a hash value corresponding to each of the plurality of divided blocks;
        generate, by aggregating the generated hash values using an exclusive OR operation (EOR) operation, an aggregation hash value having an identical length with a length of each of the generated hash values;
        generate a shuffling content by sequentially coupling and integrating the plurality of divided block;
        combine the aggregation hash value to the shuffling content;
        generate a total hash value by performing a hash function on the shuffling content to which the aggregation hash value is combined while using the aggregation hash value as a key which is based on the plurality of blocks in which head information of the target content is distributed; and
        output the generated total hash value corresponding to the shuffling content to which the aggregation hash value is combined.

* * * * *